(12) United States Patent  
Liu et al.

(10) Patent No.: US 9,325,262 B2  
(45) Date of Patent: Apr. 26, 2016

(54) BRUSHLESS MOTORS WITH LINEAR HALL SENSORS

(71) Applicant: Woodward, Inc., Fort Collins, CO (US)

(72) Inventors: Raymond Liu, Monterey Park, CA (US); Estella Chung, West Hills, CA (US); Joon H. Lee, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 51 days.

(21) Appl. No.: 14/248,686

(22) Filed: Apr. 9, 2014

(65) Prior Publication Data

US 2015/0295525 A1    Oct. 15, 2015

(51) Int. Cl.
*H02P 6/16* (2006.01)
*H02K 11/00* (2006.01)
*G06K 11/02* (2006.01)

(52) U.S. Cl.
CPC *H02P 6/16* (2013.01); *G06K 11/02* (2013.01); *H02K 11/0047* (2013.01); *H02K 11/0073* (2013.01)

(58) Field of Classification Search
CPC .............. G06K 11/02; H02K 11/0047; H02K 11/0073; H02K 29/06
USPC ...................................................... 318/400.04
See application file for complete search history.

(56) References Cited

U.S. PATENT DOCUMENTS

| | | | |
|---|---|---|---|
| 6,060,851 A * | 5/2000 | Imai et al. ..................... | 318/437 |
| 7,808,200 B2 | 10/2010 | Liu et al. | |
| 8,058,826 B2 | 11/2011 | Mock et al. | |
| 2008/0012522 A1 * | 1/2008 | Wiegers et al. ............... | 318/638 |
| 2013/0099708 A1 * | 4/2013 | Shimizu et al. .......... | 318/400.39 |
| 2014/0062360 A1 * | 3/2014 | Muramatsu et al. ..... | 318/400.14 |

* cited by examiner

*Primary Examiner* — Kawing Chan
*Assistant Examiner* — Bradley Brown
(74) *Attorney, Agent, or Firm* — Fish & Richardson P.C.

(57) ABSTRACT

A motor system includes a motor including two linear Hall sensors configured to output analog signals, and a controller configured to control the motor. The controller is operable to monitor the analog signals output from the two linear Hall sensors, determine a plurality of auxiliary signals based on the analog signals, and determine a motor position based on the plurality of auxiliary signals.

12 Claims, 15 Drawing Sheets

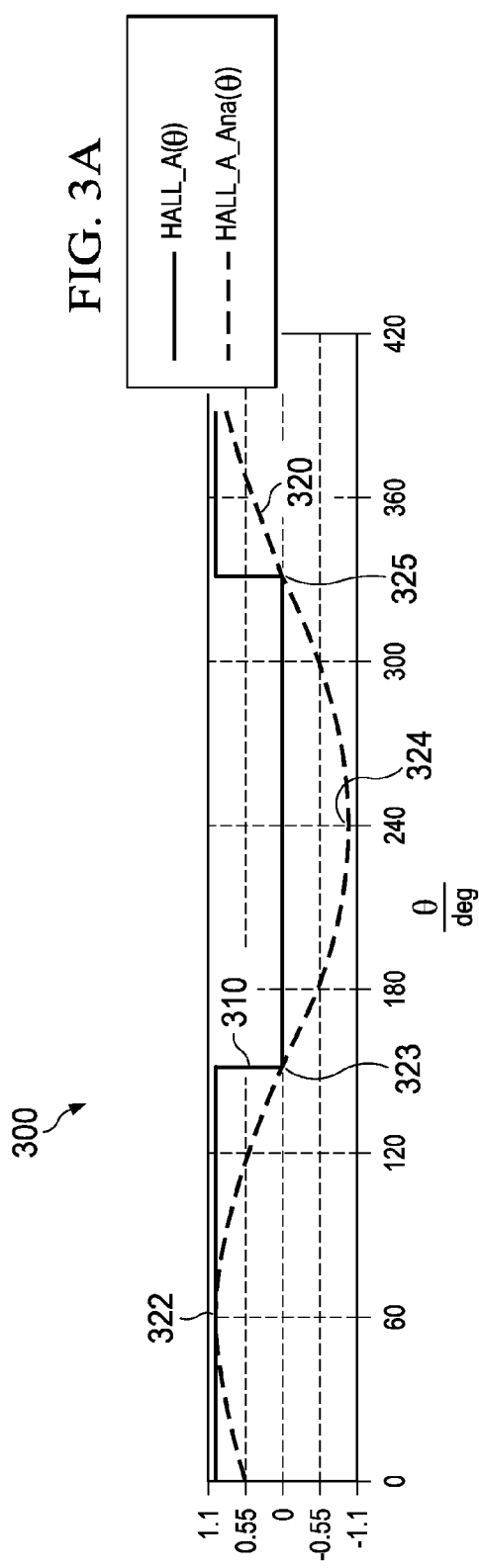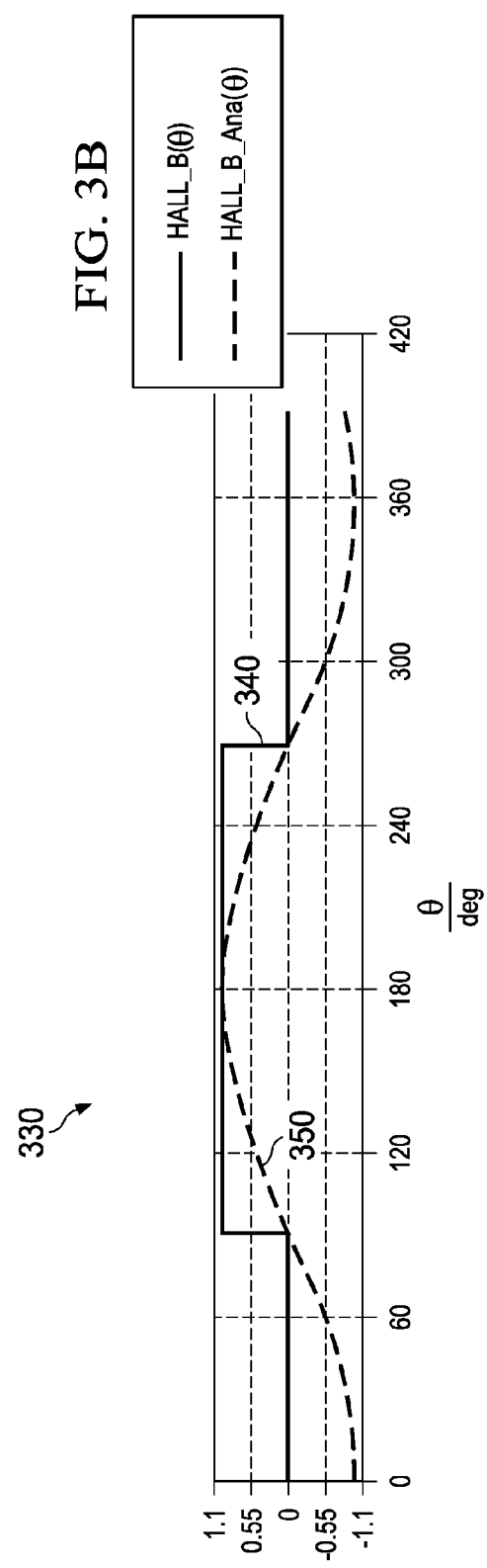

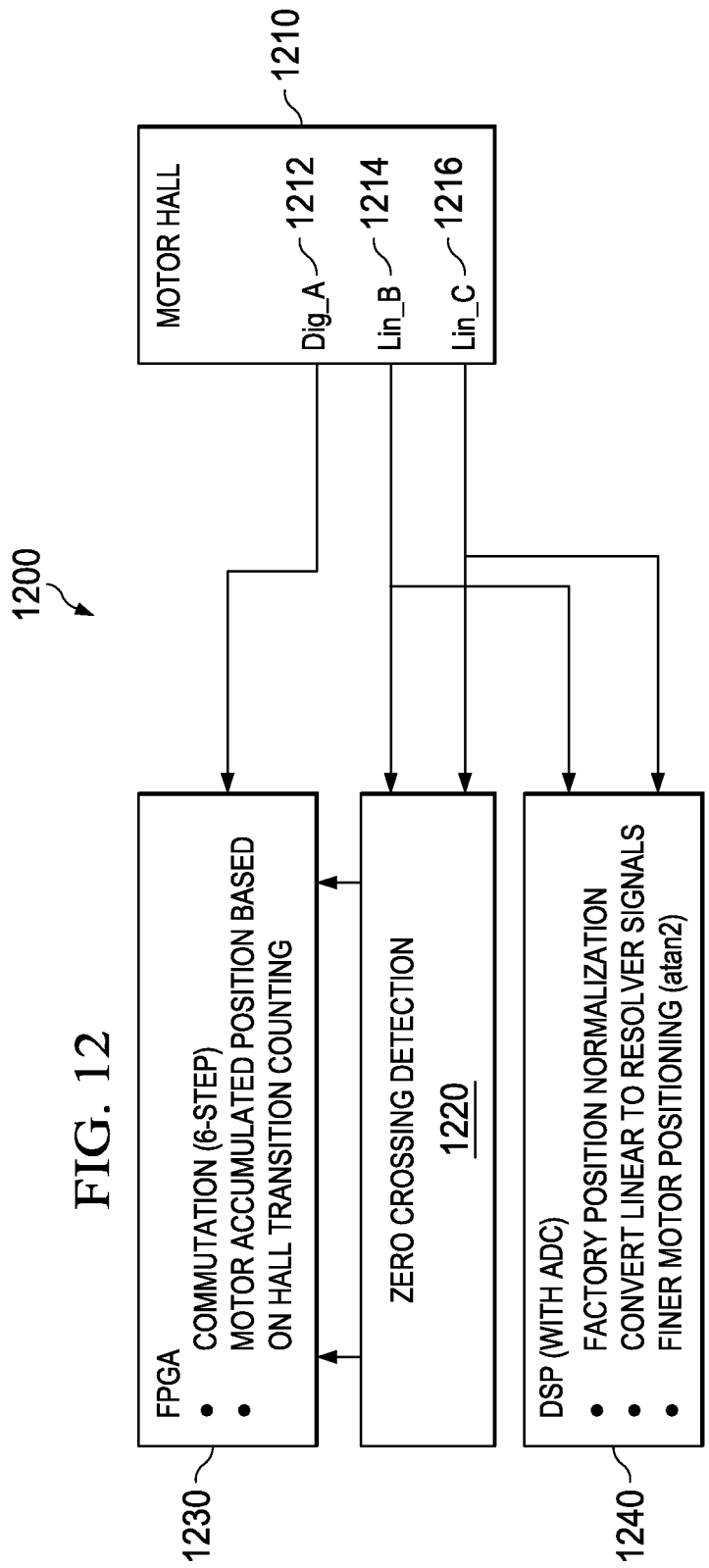

BRUSHLESS MOTORS WITH LINEAR HALL SENSORS

BACKGROUND

This specification relates to brushless motors with linear Hall sensors.

Hall-effect digital output sensors can be used to detect the discrete rotational position of a motor, such as a brushless DC (BLDC) motor. A BLDC motor typically requires at least three Hall sensors (also known as Hall-effect sensors) to effectively commutate the motor and provide motor position feedback. The Hall sensors can be used to control electronic switching or "commutation" of drive current among a plurality of motor windings. The commutation induces a rotating component to an overall magnetic field associated with the windings. The interaction of the rotating magnetic field component with the motor's permanent magnets can cause rotation of the motor. In one example, a BLDC configuration employs three windings offset from each other by 120 degrees of electrical phase.

SUMMARY

In some aspects, a motor system includes a motor including two linear Hall sensors configured to output analog signals, and a controller configured to control the motor. The controller is operable to monitor the analog signals output from the two linear Hall sensors, determine a reference signal based on one of the analog signals, convert another one of the analog signals to a shifted signal that is 90 electrical degrees from the reference signal. The controller is operable to determine a motor position based on the reference signal and the shifted signal.

In some aspects, a motor system includes a motor including two linear Hall sensors configured to output analog signals, and a controller configured to control the motor. The controller is operable to monitor the analog signals output from the two linear Hall sensors, determine a plurality of auxiliary signals based on the analog signals, and determine a motor position based on the plurality of auxiliary signals.

In some aspects, a method of operating a motor with two linear Hall sensors operable to output analog signals includes monitoring the analog signals output from the two linear Hall sensors, determining a plurality of auxiliary signals based on the analog signals, and determining a motor position based on the plurality of auxiliary signals.

Details of one or more implementations are set forth in the accompanying drawings and the description below. Other features, objects, and advantages will be apparent from the description and drawings, and from the claims.

DESCRIPTION OF DRAWINGS

FIGS. 3A-3C are plots showing example Hall sensor output signals of an motor system.

FIG. 12 is a function block diagram of an example motor system.

DETAILED DESCRIPTION

Figure 1A:
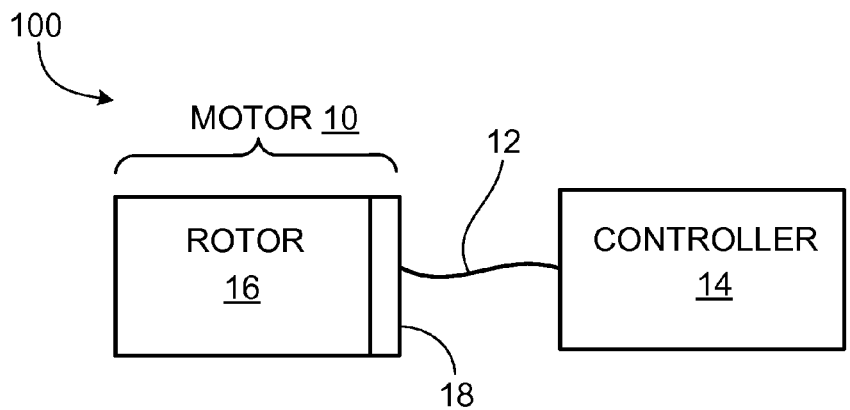
FIG. 1A is a schematic diagram of an example motor system.

Brushless direct current motors (BLDC motors) have been used in a variety of applications including, for example, vehicles, motion control systems, positioning or actuation systems, or other application systems. A BLDC motor typically requires three or more digital Hall Effect sensors for motor commutation and motor position counting to provide position feedback. In some instances, the position resolution depends on the number of magnet pole pairs on the motor rotor and the number of Hall state transitions within an electrical revolution. For example, a typical 8 pole motor with three digital Hall sensors can output 24 pulses per mechanical revolution, which corresponds to 15 mechanical degrees per pulse. With only digital Hall feedback, a 3-phase permanent magnet brushless motor may only be driven with a six-step method (described below with respect to FIG. 2A). The resultant motor rotor position feedback, torque ripple, and system energy efficiency can be limited.

The example techniques and systems described herein relate to brushless motors that include linear Hall sensors. The example systems can provide better motor position feedback resolution and more motor driving options. For example, two or more linear Hall sensors may be used in lieu of an equal number of digital Hall sensors in a 3-phase permanent magnet brushless motor. The analog signals output from linear Hall sensors and the digital signals output from the digital Hall sensors can be used to determine motor position. In some implementations, the analog signals can be converted to digital signals, for example, based on zero-crossing points of the analog signals. In this case, the motor system can operate in a similar manner to a typical brushless motor that includes three digital Hall sensors.

In other implementations, auxiliary signals can be generated or otherwise determined based on the analog signals for motor position determination. In one example, two auxiliary signals can be determined such that they have a 90-electrical-degree phase offset. The two auxiliary signals can be used as resolver signals to determine the motor position, for example, based on an arctangent function. In another example, a different number of auxiliary signals can be determined to achieve a desired motor position resolution. For example, the auxiliary signals can be determined such that they have predetermined zero-crossing points. The zero-crossing points can be used to define Hall state transitions and hence affect the motor position resolution. For instance, the output signals of the two or more linear Hall sensors can be manipulated to generate or otherwise determine auxiliary signals by performing phase shifting techniques based on trigonometry rules of adding sinusoidal waveforms with different amplitudes and phases. In some instances, the example techniques can achieve a position resolution 2 to 3 times higher than the standard 6 counts per electrical revolution using 3 digital Hall Effect sensors. Additional or different techniques can be used to increase the motor position resolution.

In some instances, a standard six-step motor drive scheme can be used to commutate the motor directly based on output signals of the three Hall sensors (e.g., one digital and two linear Hall sensors). In some implementations, all three Hall sensor output signals can be used in the Hall output counting for basic motor positioning (resulting in a 60-electrical-degree resolution), while only the two linear Hall sensors are used to determine the finer motor position resolution in between each standard 60-electrical-degree Hall transition. By combining the results of Hall counting and the finer resolution calculated from the two linear Halls, better motor rotor position resolution can be obtained. In some instances, the analog signals output from the linear Hall sensors can be normalized. In some instances, the motor position determined based on the analog signals output from the linear Hall sensors can be calibrated to improve the position accuracy. In some instances, torque enhancement techniques can be performed based on the refined motor position resolution to improve the torque output of the motor system.

Advantages of the example techniques and motor systems described herein may include, for example, better motor position resolution, higher system energy efficiency, enhanced torque characteristics, and faster response for motor commutation. In some instances, more motor specific options to achieve better or optimal designs can be provided. For example, a 4-pole motor system with two or more linear Hall sensors can have the same or better position accuracy than a typical 8-pole motor with three digital Hall sensors, while the former can be more cost-effective than the latter. In some instances, system specific driving methods can be provided based on the linear Hall sensors and can offer an improvement on the six-step method associated with the digital Hall Effect sensors. The example techniques and motor systems may achieve additional or different advantages.

FIG. 1A is a diagram showing an example motor system 100. The example motor system 100 includes a motor 10 coupled by a wiring harness 12 to a controller 14. The motor 10, for example, can be a brushless DC motor (BLDC) that includes a rotor 16 and a sensor assembly 18. The sensor assembly 18 is shown connected to the controller 14 via the wiring harness 12. The motor 10 can be used, for example, as part of a servomotor system. In some instances, the motor 10 can be a part of an electromagnetic actuator utilized to control the position of a mechanical component, such as in an aircraft. The motor 10 can also be used in other applications.

The controller 14 controls the operation of the motor 10, for example, its rotational position, direction and/or speed depending on the application. In some implementations, multiple Hall sensors or other position sensors can be used by the motor 10. For example, multiple Hall sensors can be arranged at different angular positions to achieve corresponding partial indications of motor position. The outputs of all the sensors can be used to obtain more complete position information. The position information can be used, among other things, to control electronic commutation in the motors in order to control the position of a mechanical component actuated by the motor, etc. For example, a set of three Hall sensors (e.g., as described with respect to FIGS. 1B and 1C) can be used to indicate when motor commutation should occur for the widely used six-step drive routine. In other implementations, more sensors can be used, for example, to obtain finer-grain position information, but with increased cost and complexity.

The controller 14 monitors the rotational position of the rotor 16 and controls the flow of current to the windings of the motor 10 to achieve a desired motor position, direction and/or speed for a desired actuator movement. Different types of motor control arrangements and techniques may be utilized in different implementations. Specific hardware, software, firmware, or a combination thereof can be used for controlling winding currents. For example, circuitry and software logic can be designed to configure the controller for controlling drive currents (e.g., winding currents) into the motor 10.

Figure 1B:
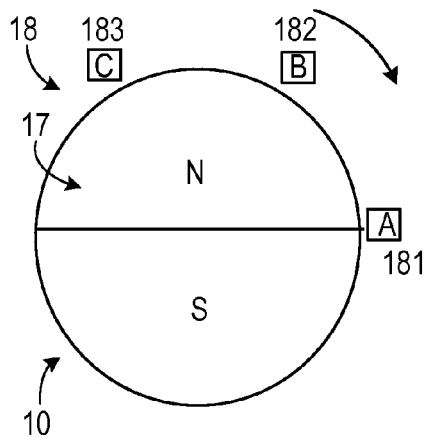
FIGS. 1B and 1C are diagrams showing example configurations of the sensor assembly 18 in FIG. 1A.

FIG. 1B is a diagram showing an example configuration of the sensor assembly 18 in FIG. 1A. In the example configuration, the sensor assembly 18 includes three Hall sensors A 181, B 182, and C 183 that are separated by 60 electrical degrees (i.e., the output signals from the Hall sensors have a 60-electrical-degree phase offset). In some implementations, the motor can include the rotor 16 and a stator (not shown), and the sensor assembly 18 can be mounted on the stator of the motor 10. The motor 10 can include one or more permanent magnet pole pairs. The number of electrical rotation cycles per mechanical rotation depends on the number of permanent magnet pole pairs, given a particular motor design. For example, the degrees of electrical rotation can be obtained by multiplying the degrees of mechanical rotation by the number of pole pairs. In the example shown in FIGS. 1B and 1C, the motor 10 includes only one permanent magnet pole pair 17. In this case, one mechanical degree is equal to one electrical degree. The motor 10 can include another number of pole pairs and the mechanical degrees can have then a different relationship with respect to the electrical degree reference.

Figure 1C:
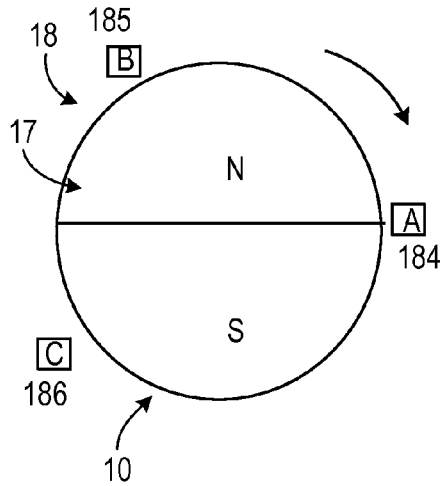

FIG. 1C is a diagram showing another example configuration of the sensor assembly 18 in FIG. 1. As illustrated, the sensor assembly 18 includes three Hall sensors A 184, B 185, and C 186 that are separated by 120 electrical degrees. A motor 10 can include a different number (e.g., 2, 4, 5, etc.) of Hall sensors that are separated by other angles not limited to 60 or 120 electrical degrees. The Hall sensors (e.g., Hall sensors 181-186) can be digital Hall sensors, linear Hall sensors, or a combination of both. As an example, the Hall sensors A 181, B 182, and C 183 in FIG. 1B can all be linear Hall sensors. As another example, two of the Hall sensors A 184, B 185, and C 186 in FIG. 1C can be linear Hall sensors while the other one can be a digital Hall sensor. A digital Hall sensor can output binary values (e.g., 0 and 1, or other values) that represent binary states of the Hall sensors; a linear Hall sensor can output an analog signal (e.g., a sinusoid signal, a pseudo-sinusoid signal, or another type of signal) that can vary linearly with the magnetic flux density. In some instances, the analog output signal of a linear Hall sensor can be converted into a digital output signal that includes two possible binary values. The digital output signal can transition from one binary value to another binary value at zero-crossing points or other appropriate points of the analog output signal.

Figure 2A:
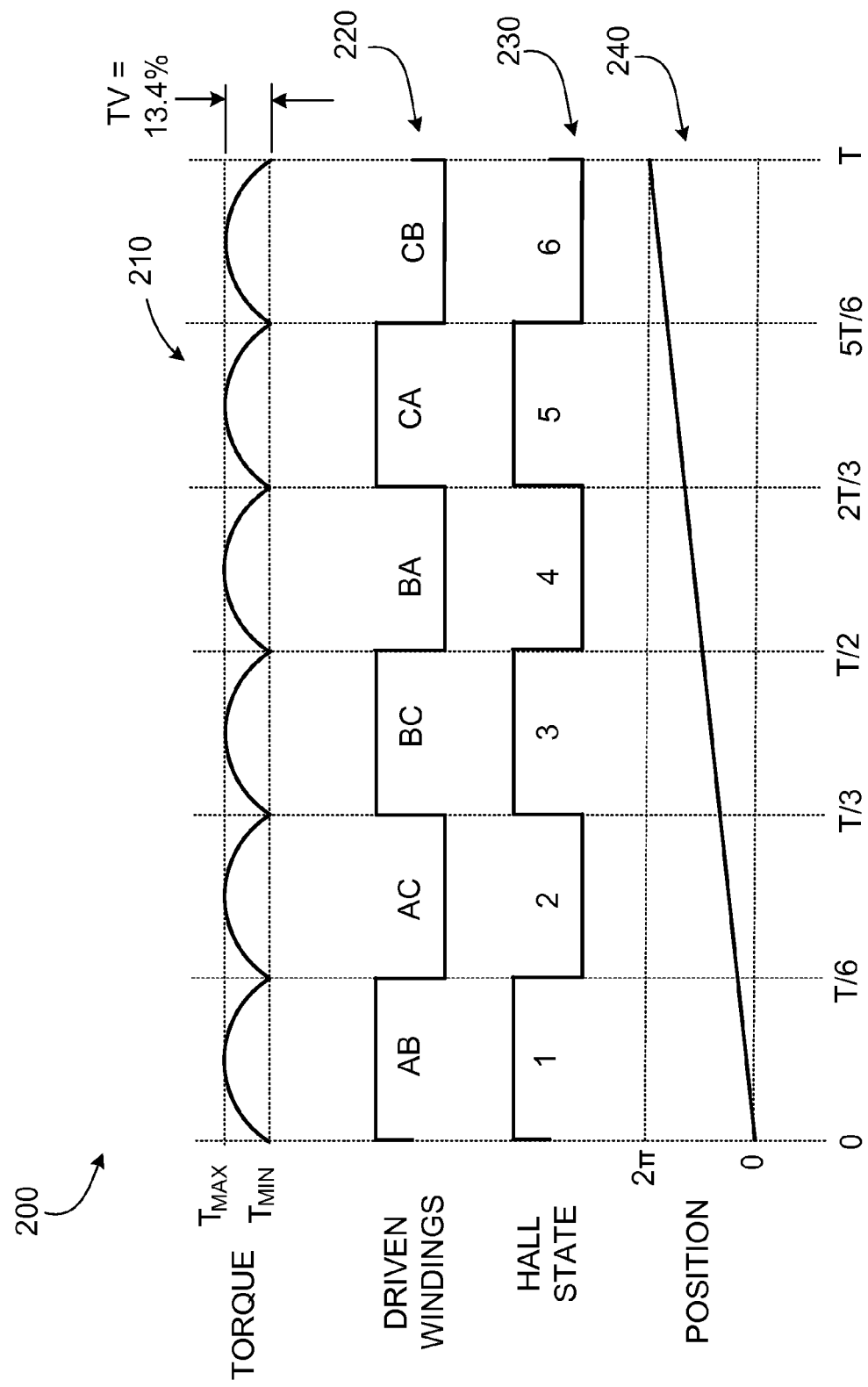
FIG. 2A is a plot showing example operations of a motor system.

FIG. 2A is a diagram 200 showing example operations of a motor system. The motor system can be the motor system 100 with the example motor 10 in FIG. 1A, or another motor system. The motor 10, for example, can include three Hall sensors separated by 60 electrical degrees as shown in FIG. 1B, or three Hall sensors separated by 120 electrical degrees as shown in FIG. 1C. One electrical rotation 240 from 0 to $2\pi$ radians is shown in FIG. 2A. Time in FIG. 2A is indicated by fractions of the motor rotation period T. The motor is assumed to have three stator phase windings labeled as A, B and C. The windings are driven pair-wise in operation through six commutation states or commutation intervals during each revolution as generally known in the art. The scheme is also known as a six-step drive scheme or a six-step commutation scheme. An example sequence of commutation states, also called a "commutation sequence" 220, is shown as AB, AC, BC, BA, CA and CB in the illustrated example. The transitions of the commutation sequence can be determined by the motor rotational position as indicated by the outputs of the Hall sensors, which are indicated by the sequence of "Hall states" 230. The example Hall state sequence 230 includes six Hall states, 1-6. Hall states 1-6 may correspond to different combinations of binary states of three Hall-effect sensors. For example, given three digital Hall sensor signals (with binary values 0 and 1) that are 120 electrical degrees apart, there can be six logic state combinations 110, 100, 101, 001, 011, and 010. Hall states 1-6 may include additional or different combinations and may have different values depending on system configurations.

In some aspects of operation, a controller of the motor (e.g., the controller 14 of the motor 10) utilizes the position information from the Hall-effect sensors in order to control commutation of the motor windings to maintain motor rotation. For example, when the motor 10 is in a range of positions corresponding to Hall state 1 (e.g., from 0 to 60 electrical degrees), then the controller 14 drives the winding pair AB where the current flows into phase A and comes back from phase B. When the Hall-effect sensor signals transition to Hall state 2, the controller 14 switches or "commutates" the driving current to windings AC, etc. Thus, the driving of the motor windings is determined by the motor position information as indicated by the output signals of the Hall sensors.

In some instances, a motor position counter (not shown) can be implemented (for example, in software or hardware) to record the transitions of the logic state of the Hall sensors and track the position of the motor. For example, the position counter may be updated by one count upon detection of a valid Hall state transition. The position counter value can increase or decrease depending on the direction of rotation of the motor. For example, the position counter may increase by one count if the detected valid Hall state transition is within the normal motor Hall state transition sequence when the motor moves clockwise (CW). Similarly, the position counter may decrease by one count if the detected Hall state transition is within the Hall state transition sequence when a motor moves counter clockwise (CCW). As a specific example of a motor with 60 electrical degree separation Hall sensor arrangement, given that the motor rotates clockwise, the logic state of the three digital Hall sensor signals (either coming from digital Hall sensors or converted from linear Hall sensor outputs) can transition according to a sequence of 111, 110, 100, 000, 001, 011, and then 111. If a state transition from 111 to 110 is observed, the position counter can increase by one count. If a state transition from 001 to 000 is observed, the position counter can decrease by one count. If no valid Hall state transition is detected, the position counter value can remain unchanged. Additional or different rules can be defined with respect to the position counter to track the motor position.

Also shown in FIG. 2A is a plot of the motor torque 210, which has the characteristic of a sum of rectified portions of the three phase voltages (back EMF). The torque exhibits ripple with a magnitude shown as a "torque valley" (TV) of 13.4%. This value represents the relative difference between the minimum torque value $T_{MIN}$ (trough at the commutation points between commutation intervals) and the maximum torque value $T_{MAX}$ (at the middle of each commutation interval). If $T_{MAX}$ has a normalized value of 1 torque unit, for example, the $T_{MIN}$ has a normalized value of 0.866 of a torque unit.

Figure 2B:
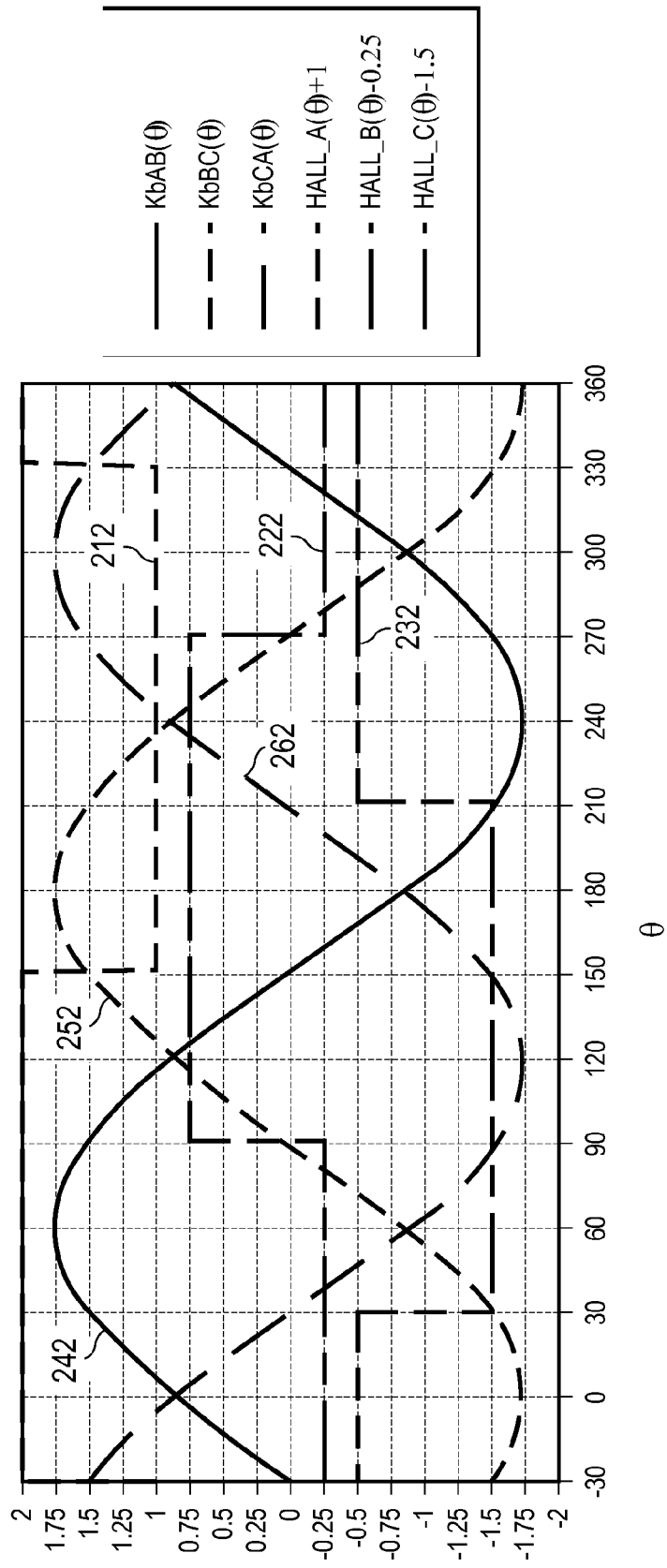
FIG. 2B is a plot showing example output signals of Hall sensors and the phase to phase back EMF voltages in a motor system.

FIG. 2B is a plot 202 showing example output signals of Hall sensors of a motor system. The motor system can be the motor system 100 with the example motor 10 in FIG. 1A, or another motor system. The motor 10, for example, can include three Hall sensors separated by 120 electrical degrees as shown in FIG. 1C. FIG. 2B shows an electrical rotation from −30° to 360° (in terms of θ). Assume that the Hall sensors A, B, and C are digital Hall sensors, lines 212, 222, and 232 illustrate example output signals Hall_A (θ), Hall_B (θ), and Hall_C (θ) of the three digital Hall sensors A, B, and C, respectively. (Note that the three output signals are vertically shifted by 1, −0.25, and −1.5, respectively, for illustration purposes.) Lines 242, 252, and 262 illustrate example line-to-line back EMF voltages KbAB, from phase A to B, KbBC, from phase B to C, and KbCA from phase C to A, respectively. In some instances, the line-to-line back EMF voltage can be obtained, for example, based on $$KbAB(\theta) = KbA(\theta) - KbB(\theta) \quad (1)$$

$$KbBC(\theta) = KbB(\theta) - KbC(\theta) \quad (2)$$

$$KbCA(\theta) = KbC(\theta) - KbA(\theta) \quad (3)$$

where KbA, KbB, and KbC are the line-to-neutral back EMF phase voltage (not shown in FIG. 2B). Given that KbA, KbB, and KbC are 120 electrical degrees apart and each has a normalized unit peak voltage value, the line to line back EMF voltages can have a peak value of 1.732 units.

Figure 3C:
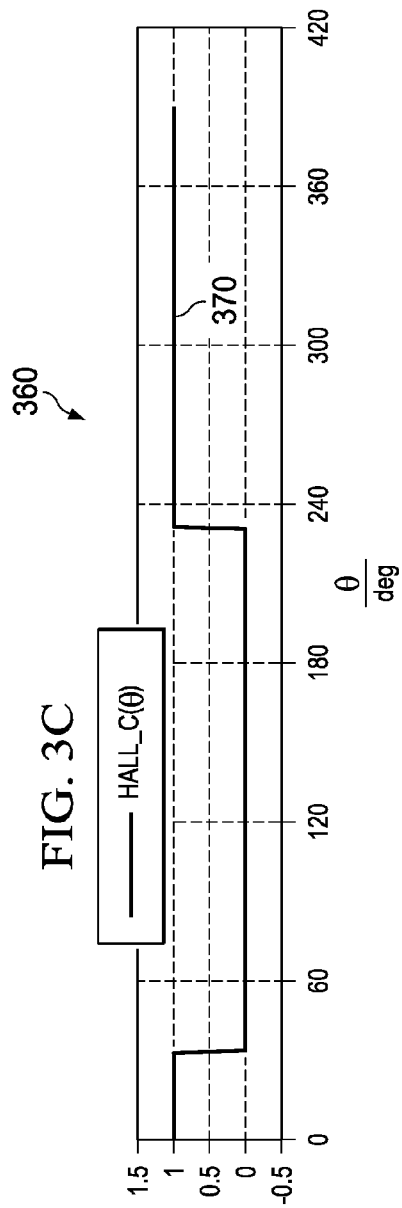

FIG. 3A-3C are plots showing example output signals of Hall sensors of a motor system. The motor system can be the motor system 100 with the example motor 10 in FIG. 1A, or another motor system. The motor 10, for example, can include three Hall sensors separated by 120 electrical degrees as shown in FIG. 1C. Among the three Hall sensors, the Hall sensors A and B can be linear Hall sensors and the Hall sensor C can be a digital Hall sensor. FIG. 3A is a plot 300 showing an example digital output signal 310 and analog output signal 320 of Hall sensor A. Similarly, FIG. 3B is a plot 330 showing an example digital output signal 340 and analog output signal 350 of Hall sensor B. FIG. 3C is a plot 360 showing an example digital output signal 370 of the digital Hall sensor C.

In some implementations, the linear Hall sensors can be placed in locations similar to locations at which the digital Hall sensors are placed in a typical BLDC with the standard six-step drive, where each of the linear sensors is in line with the corresponding line-to-line back EMF voltage. For example, the three Hall sensors A, B, C can be placed on the motor stator such that the analog output signal of the linear Hall sensor A, Hall_A_Ana 320, is in phase with the line-to-line back EMF voltage KbAB that leads line-to-neutral back EMF phase voltage KbA by 30 electrical degrees, and the analog output signal of Hall sensor B, Hall_B_Ana 350, is aligned with line-to-line back EMF voltage KbBC that leads the line-to-neutral back EMF phase voltage KbB with by 30 electrical degrees. The digital output signals of the Hall sensors can be obtained from the analog output signals (which are aligned with the line-to-line back EMF voltages), and vice versa. For example, the digital output signals Hall_A 310, Hall_B 340, and Hall_C 370 can be obtained by $$\text{Hall\_A}(\theta) = \qquad (4)$$
$$\begin{cases} 1, & \text{if Hall\_A\_Ana}(\theta) > 0 \text{ or equivalently } KbAB(\theta) > 0 \\ 0, & \text{otherwise} \end{cases}$$

$$\text{Hall\_B}(\theta) = \qquad (5)$$
$$\begin{cases} 1, & \text{if Hall\_B\_Ana}(\theta) > 0 \text{ or equivalently } KbBC(\theta) > 0 \\ 0, & \text{otherwise} \end{cases}$$

$$\text{Hall\_C}(\theta) = \qquad (6)$$
$$\begin{cases} 1, & \text{if Hall\_C\_Ana}(\theta) > 0 \text{ or equivalently } KbCA(\theta) > 0 \\ 0, & \text{otherwise} \end{cases}$$

The digital output signals can also be determined from the analog output signals in a different manner. In other implementations, the Hall sensors can be placed differently and the output signals of the Hall sensors can have a different relationship with the line-to-line or line-to-neutral back EMF voltages.

Figure 4:
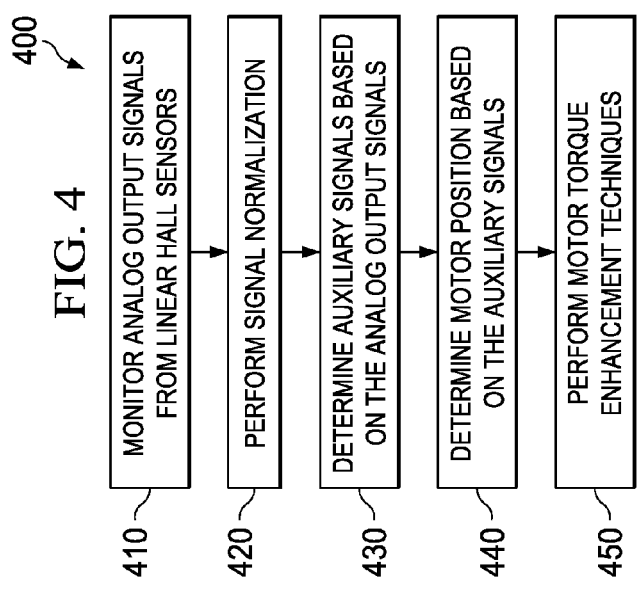
FIG. 4 is a flow chart showing an example process for operating a motor system that includes two or more linear Hall sensors.

FIG. 4 is a flow chart showing an example process 400 for operating a motor system that includes two or more linear Hall sensors. In some instances, the motor can include two linear Hall sensors and a digital Hall sensor. The three Hall sensors can be configured such that their output signals are 120 electrical degrees apart. All or part of the example process 400 may be implemented in hardware, software, firmware, or a combination thereof. In some instances, the example process 400 can be implemented as an example algorithm for the controller 14 for controlling the motor the motor 10 shown in FIG. 1. The process 400, individual operations of the process 400, or groups of operations may be iterated or performed in parallel, in series, or in another manner. In some cases, the process 400 may include the same, additional, fewer, or different operations performed in the same or a different order.

As shown in the example process 400 of FIG. 4, at 410, analog signals output from the linear Hall sensors of the motor can be monitored. In some instances, monitoring the analog signals can include detecting and receiving the analog signals output from the linear Hall sensors, for example, by appropriate circuitry or software of the motor system. The analog output signals Hall_A_Ana 320 and Hall_B_Ana 350 in FIGS. 3A and 3B are example monitored analog signals output from the linear Hall sensors. In some instances, the monitored analog output signals may have a different waveform, amplitude, or offset than the example signals Hall_A_Ana 320 and Hall_B_Ana 350, for example, due to noise, interference, or other factors. In some instances, the digital signal output from the digital Hall sensor of the motor system can also be monitored. The digital output signal Hall_C 370 in FIG. 3C can be an example monitored digital signal output from the digital Hall sensor of the motor.

At 420, the analog output signals can be normalized. For example, the amplitude, the DC voltage offset, or both can be normalized or adjusted. As an example, a linear Hall sensor can have a sinusoidal signal amplitude from 0 to 5V, where 2.5V can be the DC offset and represent the sine wave zero crossing. In some implementations, as an initialization process, a motor can be driven slowly (e.g., 1 turn/second or another speed) for at least a full mechanical turn. The peak (including valley) amplitudes (e.g., 322 and 324 of signal Hall_A_Ana 320) and the zero-crossing points (e.g., 323 and 325 of signal Hall_A_Ana 320) of the analog signals can be detected and recorded, for example, into EEPROM (Electrically Erasable Programmable Read-Only Memory) or another type of memory. The amplitudes of analog output signals of the linear Hall sensors can be normalized based on the detected peak values (e.g., 322 and 324). For example, one or more normalization parameters can be determined based on one of, a maximum of, a minimum of, an average of, or another value of the absolute values of the peak values. The determined normalization parameters can be stored and the subsequent analog output signals of the linear Hall sensor can be normalized by dividing or multiplying one or more normalization parameters. In some implementations, the amplitudes of the analog output signals of the linear Hall sensors may be normalized in another manner.

In some implementations, based on the peak (and valley) amplitudes and zero-crossing points, an analog output signal can be converted to an equivalent digital signal. For example, the digital signal 310 in FIG. 3A can be an example digital signal determined based on the analog output signal 320 such that the digital signal 310 transitions from one value (e.g., 1) to another value (e.g., 0) at the zero-crossing point 323 and transitions from the another value (e.g., 0) to the one value (e.g., 1) at the zero-crossing point 325. Digital signals can be determined from the analog output signal in another manner (e.g., based on the peaks 322 and 324, or other points). In some implementations, the two analog signals of the linear Hall sensors can be converted to equivalent digital Hall sensor signals. Together with the digital signal output from the other digital Hall sensor, three digital Hall sensor signals can be obtained. The three digital Hall sensors can be used, for example, to commute the motor based on the standard six-step drive scheme and to determine the motor position with a basic position resolution of 60 electrical degrees. In some implementations, motor commutation and basic positioning can be performed based on the zero-crossing points of the analog output signals and the digital output signal; no conversion from the analog output signals to equivalent digital signal is needed.

At 430, one or more auxiliary signals can be generated or otherwise determined based on the two analog Hall sensor signals. Two example techniques are described as to how to determine the auxiliary signals. One example technique is based on an arctangent function. Another example technique includes determination of zero-crossing points of the analog Hall sensor signals and the auxiliary signals. The example techniques can be modified, combined, or otherwise used to generate additional or different techniques for determining auxiliary signals.

Figure 5A:
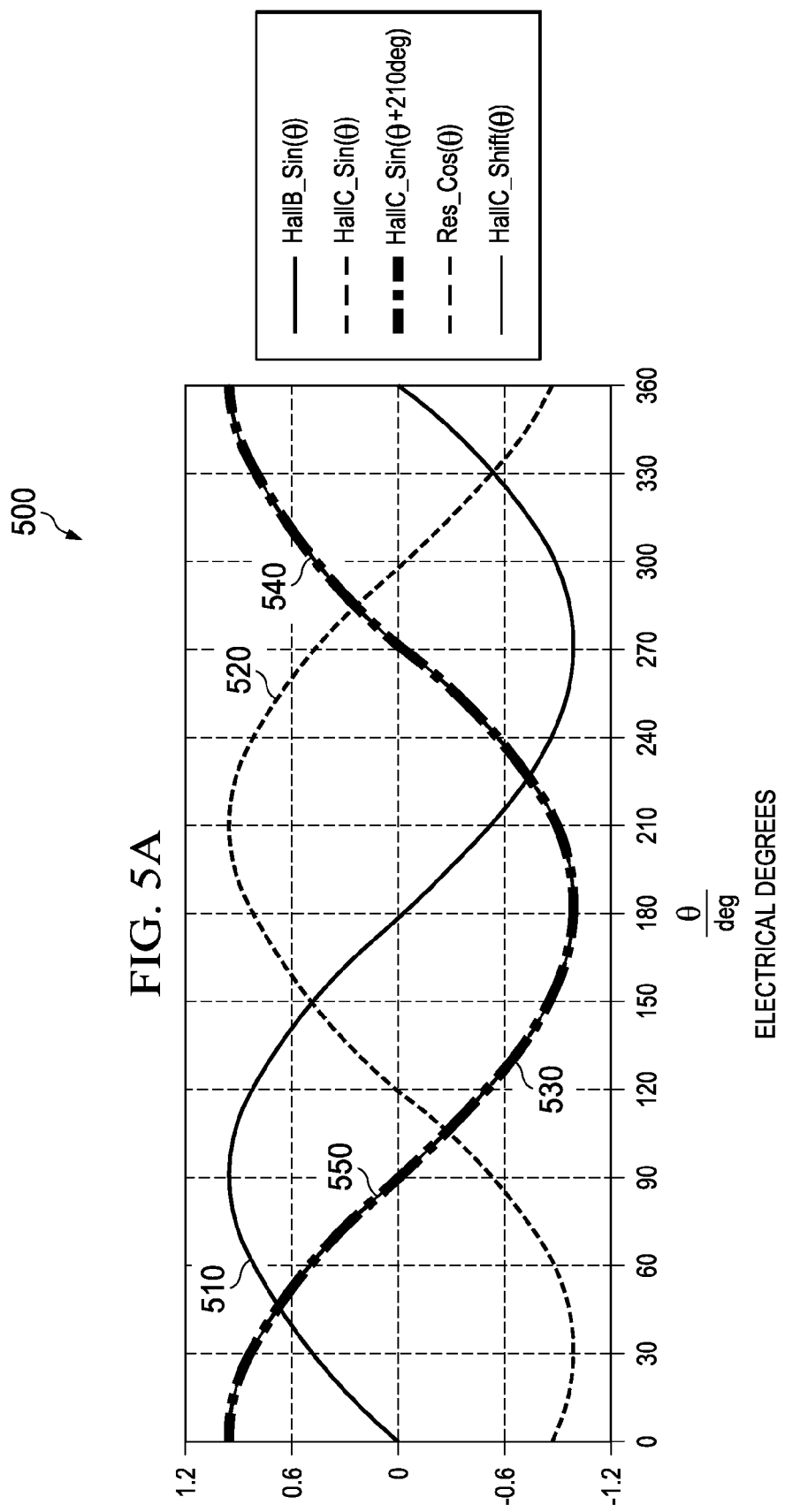
FIGS. 5A-C are plots showing example Hall sensor output signals and auxiliary signals of a motor system.

FIG. 5A is a plot 500 showing example Hall sensor output signals and auxiliary signals of a motor system. The motor system can include a digital Hall sensor A and two linear Hall sensors B and C. The analog signals output from the linear Hall sensors B and C, Hall_B Sin ($\theta$) and Hall_C Sin ($\theta$), are shown as curves 510 and 520, respectively. The analog signals Hall_B Sin ($\theta$) and Hall_C Sin ($\theta$) can be raw analog signals output from the linear Hall sensors or can be normalized or otherwise modified signals (e.g., based on the example normalization techniques described with respect to 420 of FIG. 4). In the illustrated example, the two linear Hall sensors B and C are placed such that the analog output signals Hall_B Sin ($\theta$) and Hall_C Sin ($\theta$) are offset by 120°. (Throughout the disclosure, X° represents X electrical degrees unless stated otherwise.) In other instances, the two linear Hall sensors can be placed differently and the example techniques can be adapted accordingly based on the relative positions of the two linear Hall sensors.

In some implementations, two auxiliary signals can be generated based on the two analog output signals Hall_B Sin ($\theta$) and Hall_C Sin ($\theta$) such that the two auxiliary signals have a 90° phase offset. In some implementations, one of the auxiliary signals can be a reference signal that is determined based on one of the analog signals, while the other auxiliary signal can be a shifted signal that is determined based on the other analog signal, such that the shift signal is 90° away from the reference signal. As an example, the analog signal Hall_B Sin (θ) can be selected as the reference signal Res_Sin (θ) while the shifted signal Res_Cos(θ) can be determined based on the analog signal Hall_C Sin (θ):

$$Res\_Sin(\theta) = HallB\_Sin(\theta) \quad (7)$$

$$Res\_Cos(\theta) = HallC\_Shift(\theta) \quad (8)$$

where HallC_Shift (θ) can be the analog output signal Hall_C Sin (θ) shifted by 210° (such that HallC_Shift (θ) is 90° relative to Hall_B Sin (θ) that is 120° relative to Hall_C Sin (θ)):

$$HallC\_Shift(\theta) = HallC\_Sin(\theta + 210°) \quad (9).$$

In some implementations, the shifted signal can be determined, for example, based on trigonometry rules such as the sine and cosine of sum and difference identities (as given by equations (10a) and (10b)), or the trigonometry equation of adding sinusoidal waveforms with different amplitudes and phases as given by equations (11) and (12).

$$\sin(\alpha \pm \beta) = \sin \alpha \cos \beta \pm \cos \alpha \sin \beta \quad (10a),$$

$$\cos(\alpha \pm \beta) = \cos \alpha \cos \beta \mp \sin \alpha \sin \beta \quad (10b).$$

$$(E_0 \cdot \sin(\omega\tau + \phi)) = E_1 \cdot \sin(\omega\tau) + E_2 \cdot \sin(\omega\tau + \delta) \quad (11)$$

where:

$$E_0 = \sqrt{E_1^2 + E_2^2 + 2 \cdot E_1 \cdot E_2 \cdot \cos(\delta)} \quad (12a)$$

$$\sin(\phi) = \frac{E_2}{E_0}(\sin(\delta)). \quad (12b)$$

The HallC_Shift (θ) can be obtained by:

$$HallC\_Shift(\theta) =$$
$$HallC\_Sin(\theta + 210°) = \frac{-2}{\sqrt{3}} \cdot HallC\_Sin(\theta) + \frac{-1}{\sqrt{3}} \cdot HallB\_Sin(\theta). \quad (13)$$

The curves 530, 540, and 550 in FIG. 5A represent the shifted signals HallC_Sin (θ+210°), Res_Cos(θ), and HallC_Shift (θ), respectively, which are the same in this example. In some implementations, the reference signal and the shifted signal can be determined in a different manner.

Figure 5B:
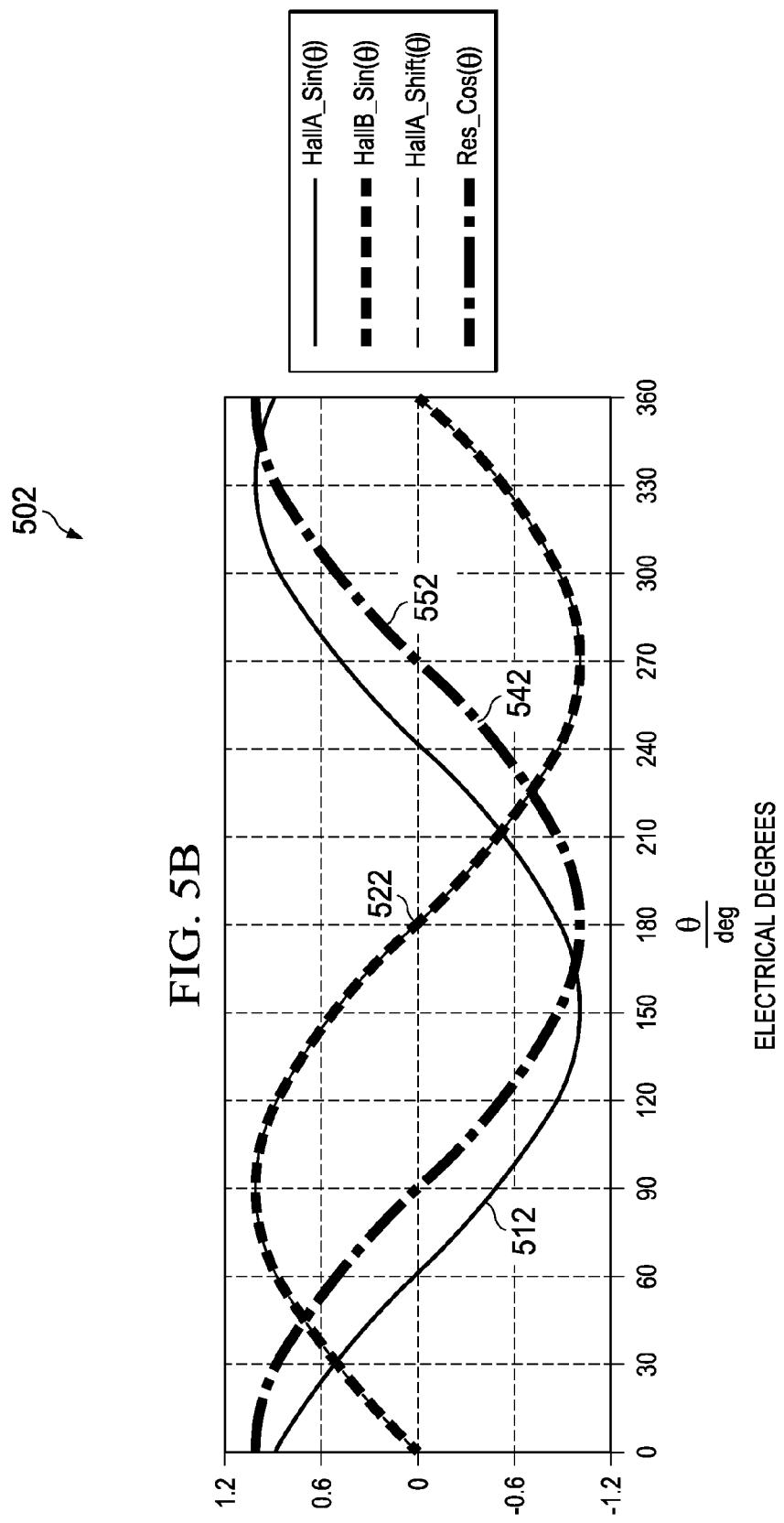

FIG. 5B is a plot 502 showing example Hall sensor output signals and auxiliary signals of another motor system. In this example, the motor system includes a digital Hall sensor C and two linear Hall sensors A and B. The analog signals output from the linear Hall sensors A and B, Hall_A Sin (θ) and Hall_B Sin (θ), are shown as curves 512 and 522, respectively. The analog signals Hall_A Sin (θ) and Hall_B Sin (θ) can be raw analog signals output from the linear Hall sensors or can be normalized or otherwise modified signals (e.g., based on the example normalization techniques described with respect to 420 of FIG. 4). In the illustrated example, the two linear Hall sensors A and B are placed such that the analog output signals Hall_A Sin (θ) and Hall_B Sin (θ) are offset by 120°. In other instances, the two linear Hall sensors can be placed differently and the example techniques can be adapted accordingly, based on the positions of the two linear Hall sensors.

In some implementations, two auxiliary signals can be determined based on the two analog output signals Hall_A Sin (θ) and Hall_B Sin (θ) such that the two auxiliary signals have a 90° phase offset. The auxiliary signals can be generated or otherwise determined according to similar techniques described with respect to FIG. 5A, or in another manner. For example, the analog signal Hall_B Sin (θ) can be selected as the reference signal Res_Sin (θ) while the shifted signal Res_Cos(θ) can be determined based on the analog signal Hall_A Sin (θ):

$$Res\_Sin(\theta) = HallB\_Sin(\theta) \quad (14)$$

$$Res\_Cos(\theta) = HallA\_Shift(\theta) \quad (15)$$

where HallA_Shift (θ) can be the analog output signal Hall_A Sin (θ) shifted by −30° (such that HallA_Shift (θ)=Hall_B Sin (θ+90°)=Hall_A Sin (θ−120°+90°):

$$HallA\_Shift(\theta) = HallA\_Sin(\theta - 30°) \quad (16).$$

Based on trigonometry rules, the shifted signal HallA_Shift(θ) can be determined by:

$$HallA\_Shift(\theta) = 2/\sqrt{3} \cdot HallA\_sin(\theta) + 1/\sqrt{3} \cdot HallB\_sin(\theta) \quad (17)$$

The curves 542 and 552 in FIG. 5B represent the shifted signals HallA_Shift (θ) and Res_Cos (θ), respectively. As described above, the two signals are the same in this example. In other instances, additional or different techniques can be used to determine the auxiliary signals.

Figure 5C:
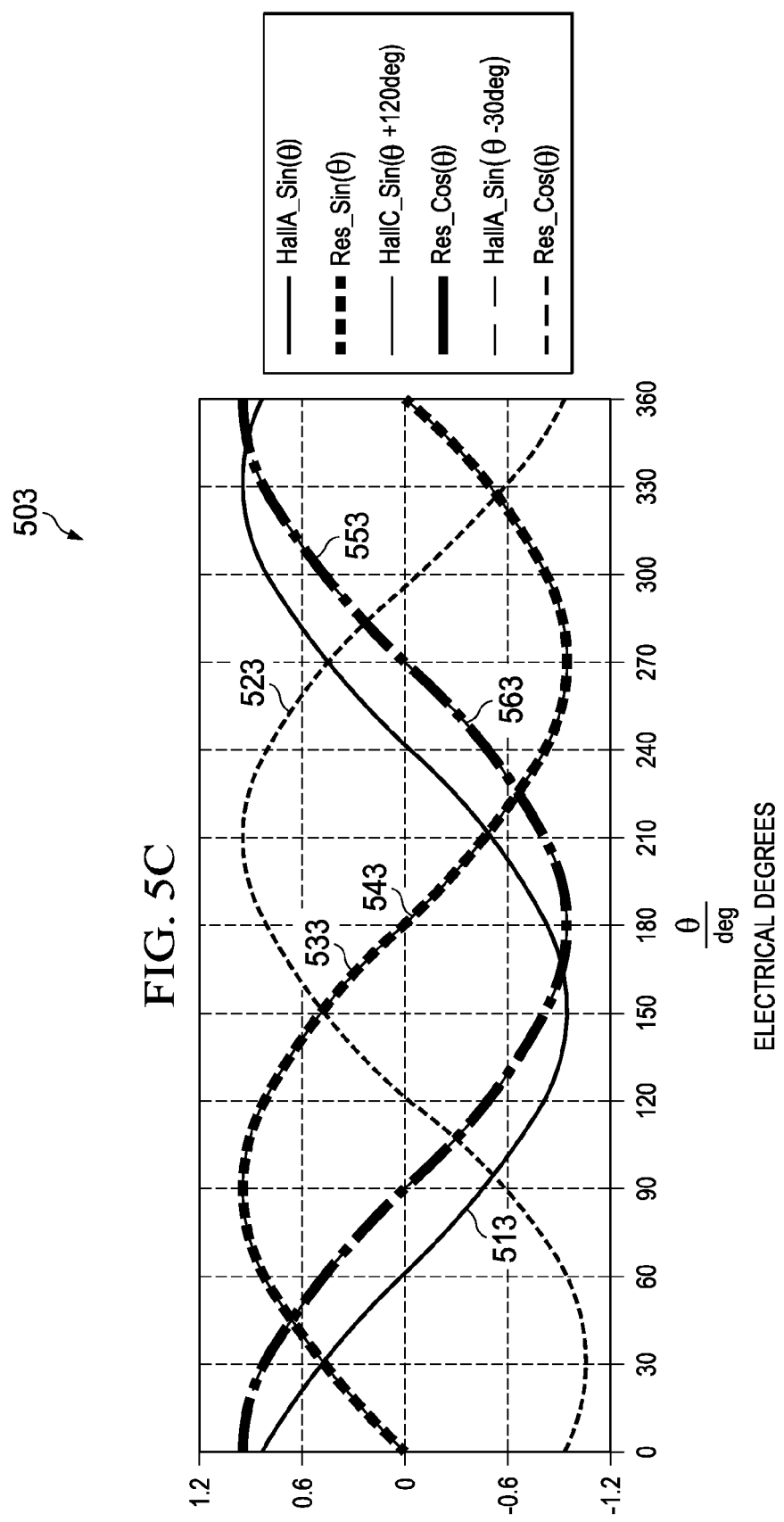

FIG. 5C is a plot 503 showing example Hall sensor output signals and auxiliary signals of another motor system. In this example, the motor system includes a digital Hall sensor B and two linear Hall sensors A and C. The analog signals output from the linear Hall sensors A and C, Hall_A Sin (θ) and Hall_C Sin (θ), are shown as curves 513 and 523, respectively. The analog signals Hall_A Sin (θ) and Hall_C Sin (θ) can be raw analog signals output from the linear Hall sensors or can be normalized or otherwise modified signals (e.g., based on the example normalization techniques described with respect to 420 of FIG. 4). In the illustrated example, the two linear Hall sensors A and C are placed such that the analog output signals Hall_A Sin (θ) and Hall_C Sin (θ) are offset by 120°. In other instances, the two linear Hall sensors can be placed differently and the example techniques can be adapted accordingly, based on the positions of the two linear Hall sensors.

In some implementations, two auxiliary signals can be generated, based on the two analog output signals Hall_A Sin (θ) and Hall_C Sin (θ), such that the two auxiliary signals have a 90° phase offset. The auxiliary signals can be generated or otherwise determined according to similar techniques described with respect to FIG. 5A, or in another manner. As an example, rather than the original output signal Hall_C Sin (θ), a shifted version of the original output signal Hall_C Sin (θ), Hall_C Sin (θ+120°) (or another signal based on Hall_C Sin (θ)) can be determined as the reference signal Res_Sin (θ). The shifted signal Res_Cos (θ) can be determined based on the analog signal Hall_A Sin (θ):

$$Res\_Sin(\theta) = HallC\_Sin(\theta + 120°) \quad (18)$$

$$Res\_Cos(\theta) = HallA\_Shift(\theta) \quad (19)$$

where HallA_Shift (θ) can be the analog output signal Hall_A Sin (θ) shifted by −30° such that $$HallA\_Shift(\theta) = Res\_Sin(\theta + 90°) = Hall\_C \ Sin(\theta + 210°)$$
$$= Hall\_A \ Sin(\theta + 210° + 120°) = HallA\_Sin(\theta - 30°) \quad (20).$$

Based on trigonometry rules, the reference signal and the shifted signal can be determined by:

$$\text{Res\_Sin}(\theta) = \text{HallC\_Sin}(\theta + 120°) = -\text{HallC\_Sin}(\theta) - \text{HallA\_Sin}(\theta) \quad (21)$$

$$\text{Res\_Cos}(\theta) = \quad (22)$$
$$\text{HallA\_Sin}(\theta - 30°) = \frac{1}{\sqrt{3}}\text{HallA\_Sin}(\theta) - \frac{1}{\sqrt{3}}\text{HallC\_Sin}(\theta).$$

In FIG. 5C, curves 533 and 543 represent the reference signals Res_Sin (θ) and Hall_C Sin (θ+120°), respectively, and curves 553 and 563 represent the shifted signals Res_Cos (θ) and HallA_Shift (θ) (i.e., HallA_Sin(θ−30°)), respectively. Additional or different techniques can be used to determine the reference signal and the shifted signal.

Referring back to step 440 in FIG. 4, given the determined auxiliary signals (e.g., reference signal Res_Sin (θ) and the shifted signal Res_Cos (θ)), the motor position can be determined. In some implementations, the reference signal Res_Sin (θ) and the shifted signal Res_Cos (θ) can be regarded as resolver signals and the motor position can be determined according to an arctangent function (e.g., a tan 2 function). The function a tan 2 is the arctangent function with two arguments. Using two arguments instead of one can help gather information on the signs of the inputs in order to return the appropriate quadrant of the computed angle. For example, for any real number (e.g., floating point) arguments x and y not both equal to zero, atan 2 (y, x) is the angle in radians between the positive x-axis of a plane and the point given by the coordinates (x, y) on it. The angle is positive for counterclockwise angles (upper half-plane, y>0), and negative for clockwise angles (lower half-plane, y<0). In some implementations, a tan function or other appropriate functions can be used to determine the motor position based on the reference signal and the shifted signal.

Figure 6:
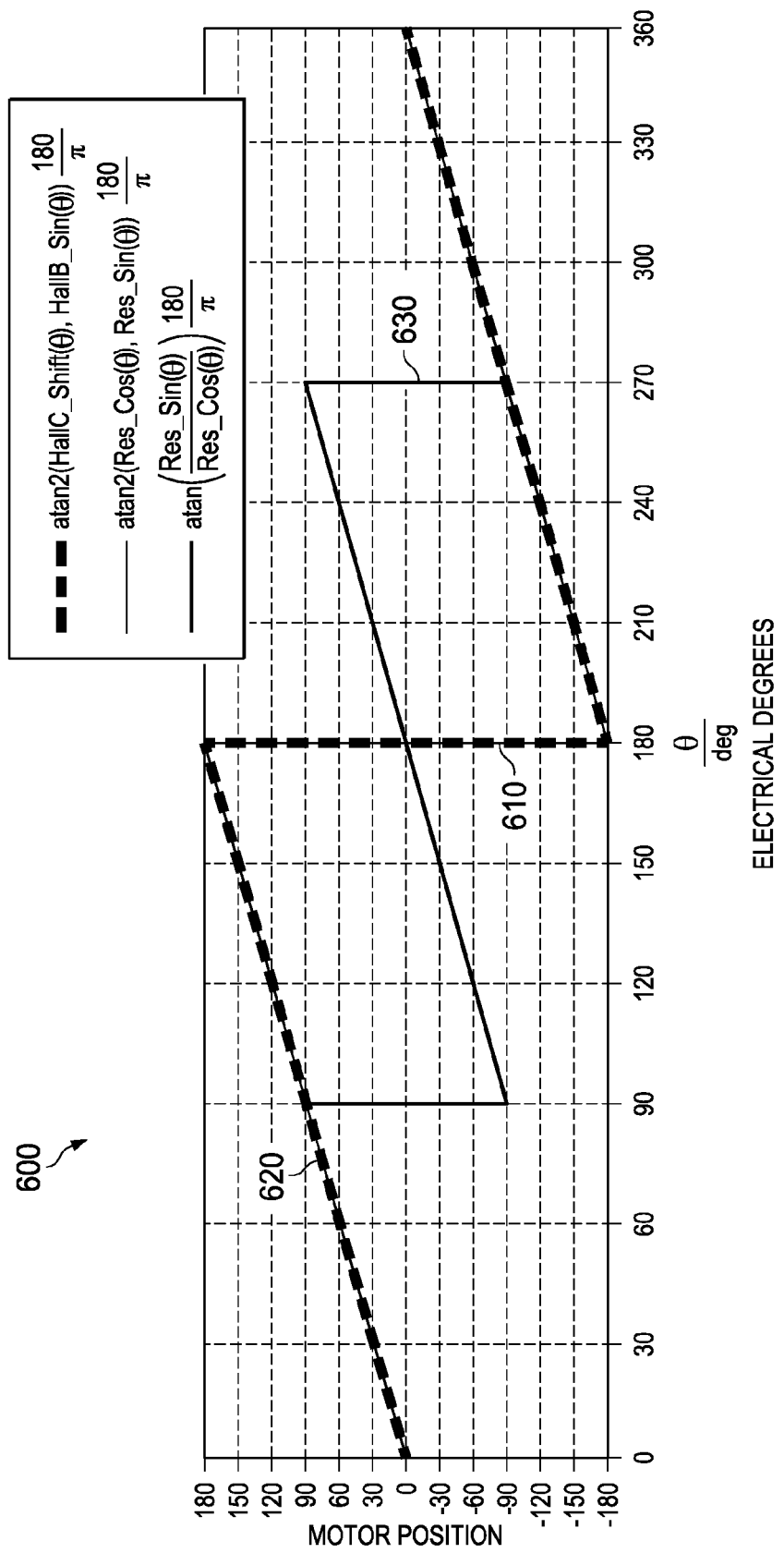
FIG. 6 is a plot showing example motor positions determined based on an example reference signal and a shifted signal according to arctangent functions.

FIG. 6 is a plot 600 showing example motor positions determined based on an example reference signal and an example shifted signal according to arctangent functions. For example, curve 610 represents the motor position determined according to an a tan 2 function with two arguments Res_Cos (θ) and Res_Sin (θ). Here the example Res_Cos (θ) and Res_Sin (θ) of FIG. 5A are used (i.e., the reference signal Res_Sin (θ) is the analog output signal HallB_Sin (θ) of the linear Hall sensor B while the shifted signal Res_Cos (θ) is HallC_Shift (θ) is determined based on the analog output signal HallC_Sin (θ) of the linear Hall sensor C). As a reference, curve 620 represents the motor position determined according to the a tan 2 function with two arguments HallC_Shift (θ) and HallB_Sin (θ), which is the same as the motor position curve 610 determined based on Res_Cos (θ) and Res_Sin (θ). Curve 630 in FIG. 6 represents the motor position determined according to the a tan function with a single argument Res_Sin (θ)/Res_Cos (θ). As illustrated, the curve 630 of the a tan function has a range of (−90°, 90°), whereas the a tan 2 function has a range (−180°, 180°], which can be mapped to [0, 360) by adding 360 to negative results in some instances.

For a given pair of Res_Cos (θ) and Res_Sin (θ), the motor position determined based on the a tan 2 function can have a fine resolution. By contrast, the typical brushless motor with three digital Hall sensors only has a position resolution of 60° (and mechanical position resolution depends on the number of poles in the motor). More accurate motor position feedback and control can be achieved based on the example techniques described here.

In some implementations, the determined motor position can be calibrated. Position calibration can be based on, for example, curve fitting or other techniques. For example, reference motor positions corresponding to two or more Hall state transitions can be determined, for example, based on the zero-crossing points of the digital or analog Hall sensor output signals. One or more reference curves can be fitted based on the reference motor positions. Two or more motor positions corresponding to the reference motor positions can be determined, for example, based on the reference signal Res_Cos (θ) and shifted signal Res_Sin (θ), or other position determination techniques. One or more curves (as used herein, the term curve may include a line) can be fitted based on the two or more determined motor positions. Position calibration can be performed based on the fitted position curves. Position calibration can be performed during an initialization process, or can be performed from time to time as needed.

As an example, for a 360° electrical revolution, there are six known Hall states (e.g., 100, 110, 010, 011, 001, 101) for three Hall sensors separated by 120 electrical degrees. State transitions occur at a known electrical angle (e.g., 60°, 120°, 180°, 240°, 300°, and 360°). The known electrical angle can be regarded as reference motor positions for position calibration. The reference motor positions can be determined, for example, based on the zero-crossing points of the digital or analog Hall sensor output signals. In some instances, a logic circuit of the motor system can output a pulse at each of the six hall state transitions per electrical cycle. For position calibration, at each state transition, when triggered by the state transition pulse from the logic circuit, a processing element of the motor system can read the analog signals output from the linear Hall sensors B and C, determine a motor position based on the analog signals output signals (e.g., using the example techniques described with respect to 430 and 440 of the example process 400 in FIG. 4), and then compare the determined motor position with the known motor position at the state transition point. The determined motor positions can be adjusted or otherwise calibrated to the reference motor positions or another desired positions.

In some implementations, curve fitting (including line fitting) techniques can be used to calibrate the motor position. For instance, for a first Hall state transition at 60 electrical degrees (x1), a first feedback position y1 can be determined. For a second Hall state transition at 120 electrical degrees (x2), a second feedback position y2 can be determined. The line segment connecting the two feedback positions can have a slope:

$$m_{read} = \frac{y2 - y1}{x2 - x1}, \quad (23)$$

and an offset:

$$b_{read} = y1 - m\_read \cdot x1 \quad (24).$$

Let $y_{n1}$ and $y_{n2}$ represent ideal (or known reference) motor positions. The reference motor positions, for example, can be determined by reading the digital Hall state outputs in the six-step sequence, each of which transitions at a known or fixed motor position. For instance, when the Hall state outputs turn to 100 and 110, the reference motor positions can be determined to be 60° and 120°, respectively. $y_1$ and $y_2$ represent the motor positions determined based on the reading of the analog signals at the corresponding transitioning points (e.g., according to the arctangent method described with respect to FIGS. 5A-C and 6 or another method). A line segment $y_{ideal}$ connecting the two ideal motor positions and another line segment $y_{read}$ connecting the two determined motor positions based on the reading can be determined, and their respective slopes and offset can be determined, for example based on equations (23) and (24).

Figure 7:
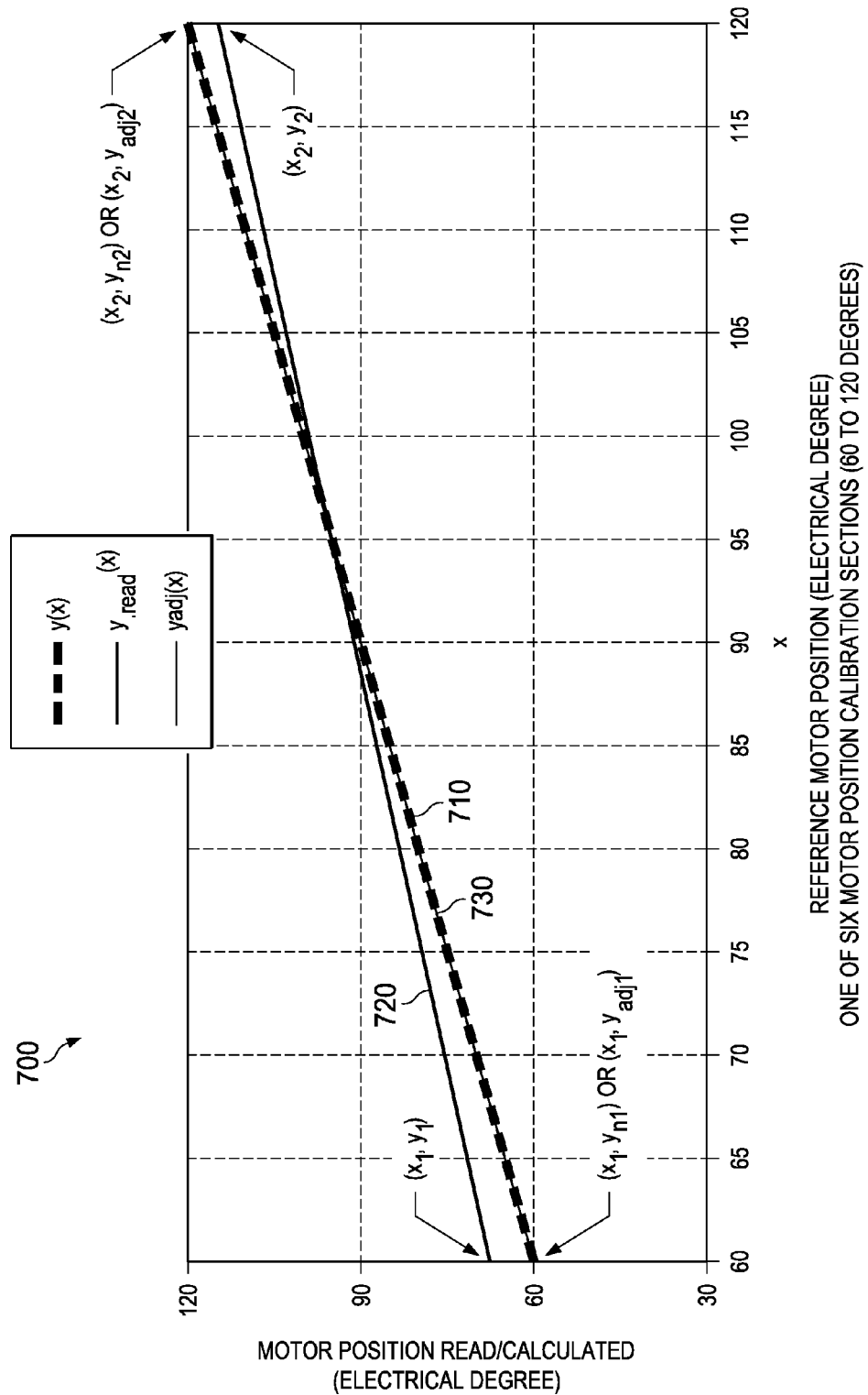
FIG. 7 is a plot showing aspects of an example position calibration method.

FIG. 7 is a plot 700 showing aspects of an example position calibration method. As illustrated, FIG. 7 includes line segment $y_{ideal}$ 710 and line segment $y_{read}$ 720. The line segment $y_{ideal}$ 710 connects (x1, $y_{n1}$) and (x2, $y_{n2}$) while the line segment $y_{read}$ 720 connects points (x1, y1) and (x2, y2), where x1=60 and x2=120, $y_{n1}$=60, $y_{n2}$=120, 1=68, y2=115. (x1, $y_{n1}$) and (x2, $y_{n2}$) can have different values in electrical degrees. The slope and offset of the line segment $y_{ideal}$ 710 can be determined by:

$$m_{ideal} = \frac{(y_{n2} - y_{n1})}{(x2 - x1)} = 1 \tag{25}$$

$$b_{ideal} = y_{n1} - n_{ideal} \cdot x1 = 0. \tag{26}$$

The slope and offset of the line segment $y_{read}$ 720 can be determined by:

$$m_{read} = \frac{(y2 - y1)}{(x2 - x1)} = 0.783 \tag{26}$$

$$b_{read} = y1 - m_{read} \cdot x1 = 21. \tag{27}$$

By mathematical manipulation, $$x1 = \frac{(y_{n1} - b_{ideal})}{m_{ideal}} \tag{28}$$

$$x1 = \frac{(y_1 - b_{read})}{m_{read}} \tag{29}$$

$$\frac{(y_{n1} - b_{ideal})}{m_{ideal}} = \frac{(y_1 - b_{read})}{m_{read}} \tag{30}$$

$$\frac{(y_{n1} - 0)}{m_{ideal}} = \frac{(Y_1 - b_{read})}{m_{read}}, \tag{31}$$

given the determined motor position $y_1$ on the line segment $y_{read}$, the corresponding ideal motor position $y_{n1}$ on the line segment $y_{ideal}$ can be obtained by:

$$(y_{n1}) = \left(\frac{m_{ideal}}{m_{read}}\right) \cdot (y_1 - b_{read}). \tag{32}$$

In some instances, the determined motor position can be adjusted or calibrated to the ideal or reference motor positions so that $v_{adj1} = y_{n1}$ and $y_{adj2}$ can be determined by $$y_{adj2} = y_{n2} = \left(\frac{m_{ideal}}{m_{read}}\right) \cdot (y_2 - b_{read}) = 120. \tag{33}$$

FIG. 7 shows the calibrated line segment $y_{adj}$ 730 that connects the calibrated motor positions $y_{adj1}$ and $v_{adj2}$. As expected, the calibrated line segment $y_{adj}$ 730 overlaps with the ideal line segment $y_{ideal}$ 710.

In general, a 360° electrical revolution may be divided into multiple sections (e.g., 0~60°, 60°~120°, 120°~180°, 180°~240°, 240°~300°, and 300°~360°) based on the known Hall state transition points (e.g., x=0°, 60° . . .

360°). For each section, the ideal motor position curve $y_{ideal}$ (x) can be a line segment, for example, given by:

$$y(x) = x \tag{34}$$

The ideal motor position curve $y_{ideal}$(x) can have another expression, and can be the same or different among different sections. The determined motor position curve $y_{read}$(x) can be another line segment represented by:

$$y_{read}(x) = m_{read} \cdot x + b_{read} \tag{35}$$

The slope $m_{read}$ and offset $b_{read}$ for each section can be obtained, for example, based on the equations (23) and (24), given two or more determined position points (e.g., (x1, y1) and (x2, y2),) that are within the section. The slope and offset can be saved into non-volatile memory for position calibration of other points in the section. For instance, given another motor position point (x3, y3) determined based on the linear Hall sensor signals, a section that the position point falls in can be determined, for example, based on x3. Corresponding slope $m_{read}$ and offset $b_{read}$ for the section that $y_{read}$ can be identified and read from the memory. The adjusted or calibrated motor position for any x within the section can be obtained by:

$$y_{adj}(x) = \left(\frac{m_{ideal}}{m_{read}}\right) \cdot (y_{read}(x) - b_{read}) \tag{36}$$

where $m_{ideal}$=1 in this example. Table 1 includes example position calibration parameters for six sections within a 360° electrical revolution. In some implementations, additional or different techniques can be used for motor position calibration.

TABLE 1

Example Parameters for Motor Position Calibration

| Elec deg | HA HB HC | m_read | b_read |
|---|---|---|---|
| 60 | 010 | X1 = 60 deg, y1 = read | Section 1 offset value |
| 120 | 011 | X2 = 120 deg, y2 = read | Section 1 offset value |
| 120 | 011 | X1 = 120 deg, y1 = read | Section 2 offset value |
| 180 | 001 | X2 = 180 deg, y2 = read | Section 2 offset value |
| 180 | 001 | X1 = 180 deg, y1 = read | Section 3 offset value |
| 240 | 101 | X2 = 240 deg, y2 = read | Section 3 offset value |
| 240 | 101 | X1 = 240 deg, y1 = read | Section 4 offset value |
| 300 | 100 | X2 = 300 deg, y2 = read | Section 4 offset value |
| 300 | 100 | X1 = 300 deg, y1 = read | Section 5 offset value |
| 360 | 110 | X2 = 360 deg, y2 = read | Section 5 offset value |
| 360 | 110 | X1 = 360 deg, y1 = read | Section 6 offset value |
| 60 | 010 | X2 = 60 deg, y2 = read | Section 6 offset value |

In some instances, a system may not require as fine a resolution as the example technique based on the arctangent function. For example, the system may only require increasing the discrete position resolution (e.g., 60° resolution of a typical motor with three digital Hall sensors) by a factor of 2 or 3. In some implementations, another example technique can be used to generate auxiliary signals for motor position determination for a desired motor position resolution. In some implementations, the example technique can have a simpler motor design and circuit design, lower motor cost, and/or less processing power than the example technique based on the arctangent function.

In some implementations, a desired motor position resolution can be determined. For a p-pole motor, if the number of Hall state transitions within an electrical revolution is T, the number of Hall state transitions per mechanical revolution can be pT/2 and the position resolution can be $$\frac{720}{pT}$$

mechanical degrees. For example, a typical 8-pole motor with three digital Hall sensors can have T=6 Hall state transitions within an electrical revolution and can output pT/2=24 pulses per mechanical revolution, which corresponds to $$\frac{720}{pT} = 15$$

mechanical degrees per pulse. Therefore, the position resolution can be equivalently described in terms of $$\frac{360}{T}$$

electrical degrees, which can be mapped to $$\frac{720}{pT}$$

mechanical degrees by multiplying a factor of $$\frac{2}{p}$$

for a given p-pole motor.

The desired motor position resolution can be, for example, 30°, 20° (electrical degrees), or some other value. Based on the desired position resolution, the number of the auxiliary signals can be determined. For example, given a motor that includes two linear and one digital Hall sensors, two analog signals and one digital signal output from the Hall sensors can be obtained. Two equivalent digital signals can be determined based on the two analog Hall sensor signals, for example, by referencing two zero-crossing points of each of the two analog Hall sensor signals. If the two analog and one digital Hall sensor output signals are separated by 120°, there can be six zero-crossing points within the electrical revolution of 360° and any two adjacent zero-crossing points can be separated by 60°, corresponding to six Hall states (e.g., 100, 110, 010, 011, 001, 101) and hence a 60° motor position resolution. In some instances, for a desired position resolution of 30°, $$T = \frac{360°}{30°} = 12$$

Hall state transitions may be needed. Hall state transitions can be determined, for example, by referencing zero-crossing points of a signal. Therefore, three auxiliary signals may be needed such that there are, in total, six signals and twelve zero-crossing points within an electrical revolution. Any two adjacent zero-crossing points can be separated by 30°, rendering a position resolution of 30°. Analogously, for a desired position resolution of 20°, nine auxiliary signals can be determined such that there can be, in total, twelve Hall sensor signals with twenty-four zero-crossing points uniformly distributed within an electrical revolution. Other levels of motor position resolution and corresponding numbers of auxiliary signals can be determined.

Figure 8:
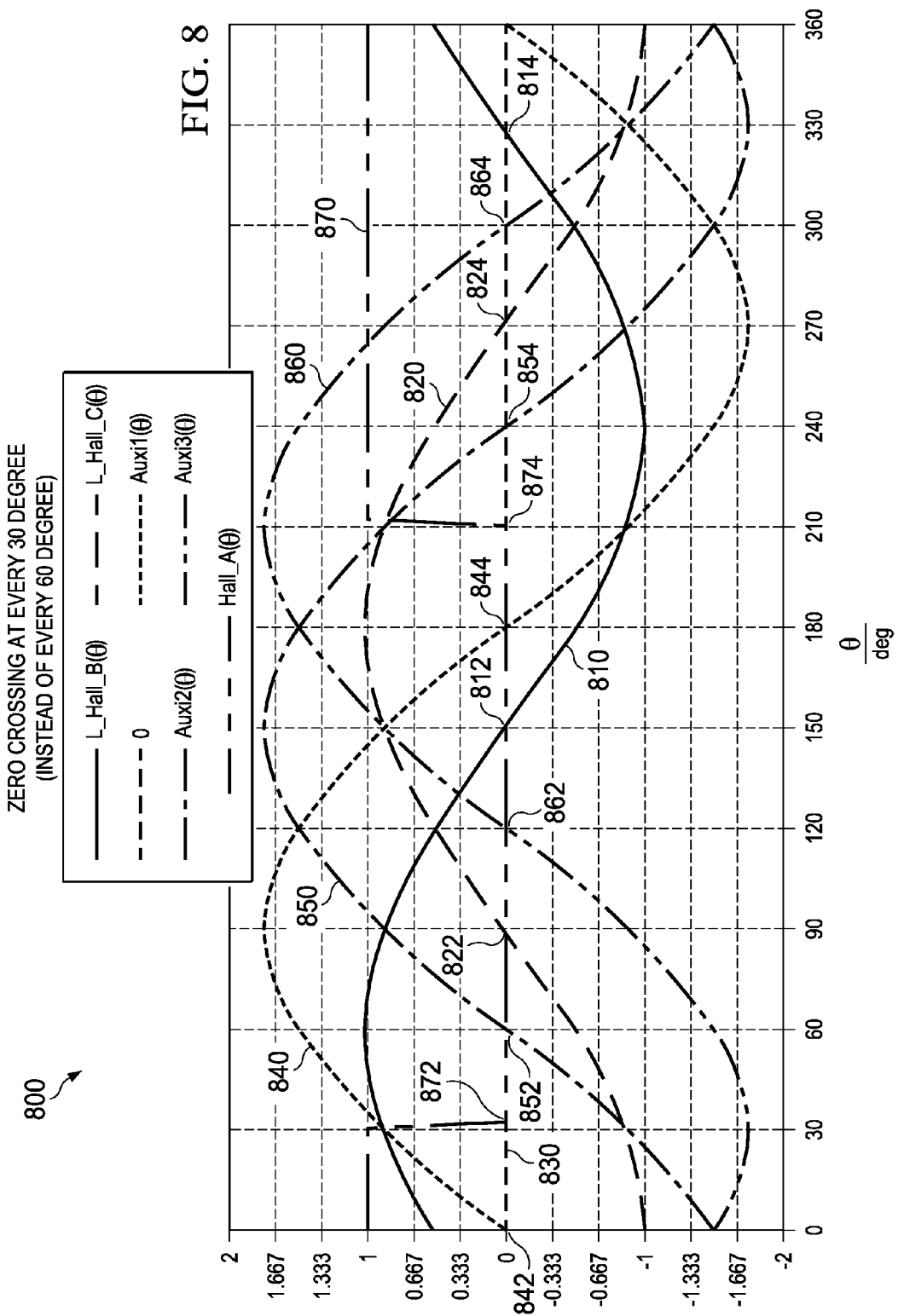
FIG. 8 is a plot showing example Hall sensor output signals and auxiliary signals of a motor system that has a 30 electrical degree motor position resolution.

FIG. 8 is a plot 800 showing example Hall sensor output signals and auxiliary signals of a motor system that has a 30° motor position resolution. The motor system can include a digital Hall sensor A and two linear Hall sensors B and C. The analog signals output from the linear Hall sensors B and C, L_Hall_B ($\theta$) and L_Hall_C ($\theta$), are shown as curves 810 and 820, respectively. The analog signals L_Hall_B ($\theta$) and L_Hall_C ($\theta$), can be raw analog signals output from the linear Hall sensors or can be normalized or otherwise modified signals (e.g., based on the example normalization techniques described with respect to 420 of FIG. 4). The digital signal Hall_A ($\theta$) output from the digital Hall sensor A is shown as curve (line) 870. In the illustrated example, the three Hall sensors A, B and C are placed such that the phases of the output signals Hall_A ($\theta$), L_Hall_B ($\theta$), and L_Hall_C ($\theta$) are offset by 120°. In other instances, the Hall sensors can be placed differently and the example techniques can be adapted accordingly based on the positions of the Hall sensors.

The axis 830 is a reference line of zero amplitude. As illustrated, within an electrical revolution of 0=0~360°, the analog output signal L_Hall_B ($\theta$) 810 has two zero-crossing points 812 and 814 at 150° and 330°, respectively. The analog output signal L_Hall_C ($\theta$) 820 has two zero-crossing points 822 and 824 at 90° and 270°, respectively. The digital output signal Hall_A ($\theta$) 870 has two zero-crossing points 872 and 874 at 30° and 210°, respectively. As a result, the three Hall sensor output signals 810, 820, and 870 provide six zero-crossing points 812, 814, 822, 824, 872, and 874, separated by 60° each.

To obtain a position resolution of 30°, 6 additional zero-crossing points and hence 3 auxiliary signals may be needed. The plot 800 also includes three auxiliary signals Auxi1($\theta$) 840, Auxi2($\theta$) 850, and Auxi3($\theta$) 860. In some implementations, an auxiliary signal can be determined by multiplying, shifting, combining, or otherwise manipulating the analog signals based on trigonometry rules (e.g., based on formula (10)-(12)). In some instances, the auxiliary signal can be determined such that the auxiliary signal has a zero-crossing point at a predetermined position. For example, the auxiliary signal Auxi1($\theta$) 840 can be generated or otherwise determined such that it has two zero-crossing points 842 and 844 at 0° and 180°, respectively. The example formula as shown in Equations (10a), (10b), (11), (12a) and (12b) or other techniques can be used to determine an auxiliary signal that has one or more predefined zero-crossing points. In the example shown in FIG. 8, the auxiliary signal Auxi1($\theta$) 840 can be obtained by $$Auxi1(\theta) = (L\_Hall\_C(\theta)) + 2(L\_Hall\_B(\theta)) \quad (37).$$

Similarly, the auxiliary signal Auxi2(θ) 850 can be determined such that it has two zero-crossing points 852 and 854 at 60° and 240°; and the auxiliary signal Auxi3(θ) 860 can be determined such that it has two zero-crossing points 862 and 864 at 120° and 300°, respectively. As an example, the auxiliary signals Auxi2(θ) 850 and Auxi3(θ) 860 can be obtained by:

$$Auxi2(\theta)=2(L\_Hall\_C(\theta))+L\_Hall\_B(\theta) \quad (38)$$

$$Auxi3(\theta)=(L\_Hall\_C(\theta)-L\_Hall\_B(\theta)) \quad (39).$$

The auxiliary signals can be determined based on the analog signals L_Hall_C (θ) and L_Hall_B(θ) in a different manner. In some instances, one or more of the auxiliary signals (e.g., signals 840-860) can be digital signals. Each digital signal can transition from one binary value to another binary value at a predetermined zero-crossing point. In some instances, the digital Hall Effect sensor A does not have to be used. The digital output signal 870 can be derived based on amplitude comparison method of other signals. For instance, the digital Hall sensor output Hall_A(θ) 870 can be determined to be one binary value (e.g., 0) when Auxi1(θ) >L_Hall_B(θ), otherwise, Hall_A(θ) 870 can be determined to be another binary value (e.g., 1). Additional or different analog output signals or auxiliary signals can be used to determine the digital output signal 870 or other auxiliary signals. In some implementations, additional auxiliary signals can be generated based on the signals 810-870 to further increase the number of zero-crossing points and hence the motor position resolutions.

In the example illustrated in FIG. 8, with all 6 signals 810, 820, and 840-870, there are 12 zero-crossing points separated by 30° and the position resolution can be 30°. A 4-pole motor that includes the two analog Hall sensors and one digital Hall sensor would have a position resolution of 24 or more states per motor revolution, compared with a resolution of 12 states per motor revolution for a typical 4-pole motor with 3 digital Hall Effect sensors.

Figure 9:
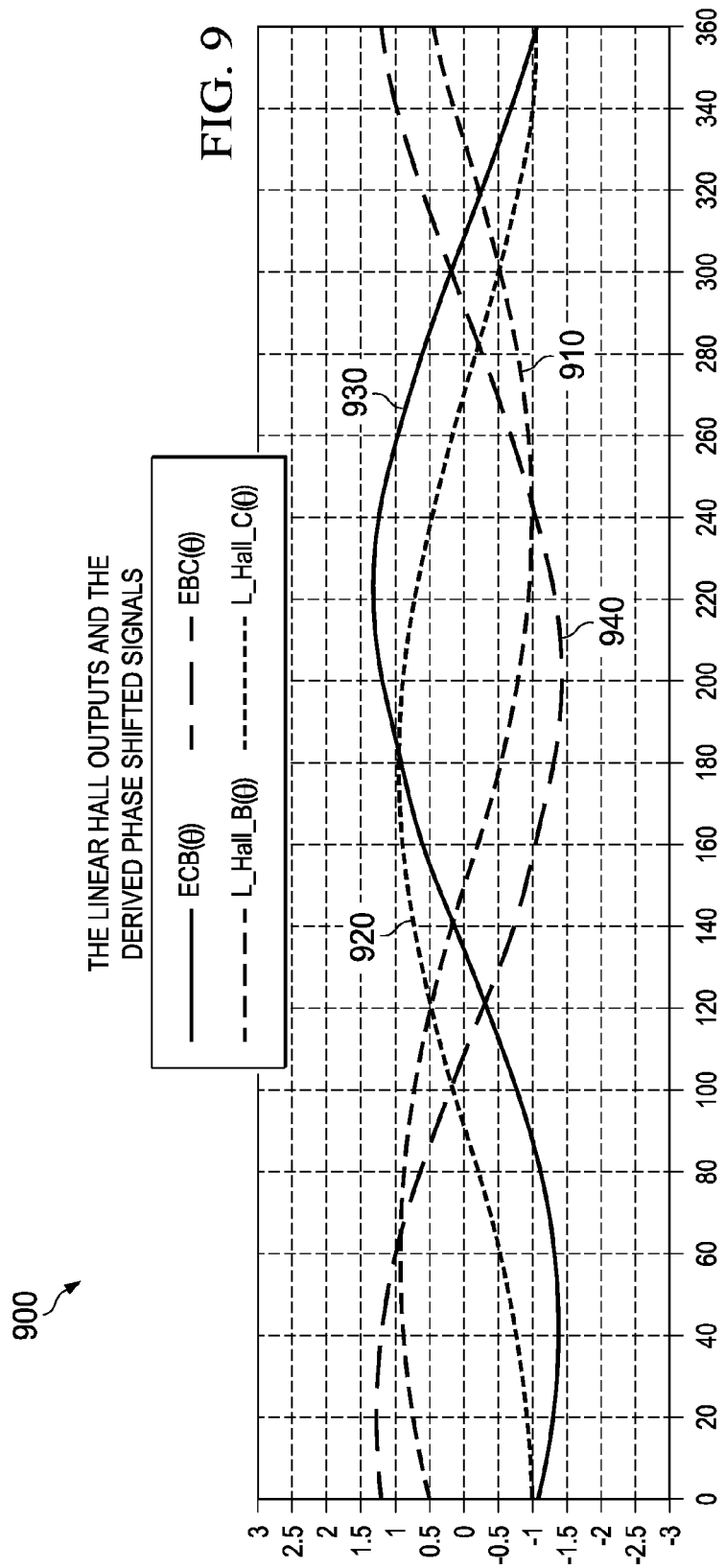
FIGS. 9 and 10 are plots showing example Hall sensor output signals and auxiliary signals of a motor system that has a 20 electrical degree motor position resolution.
Figure 10:
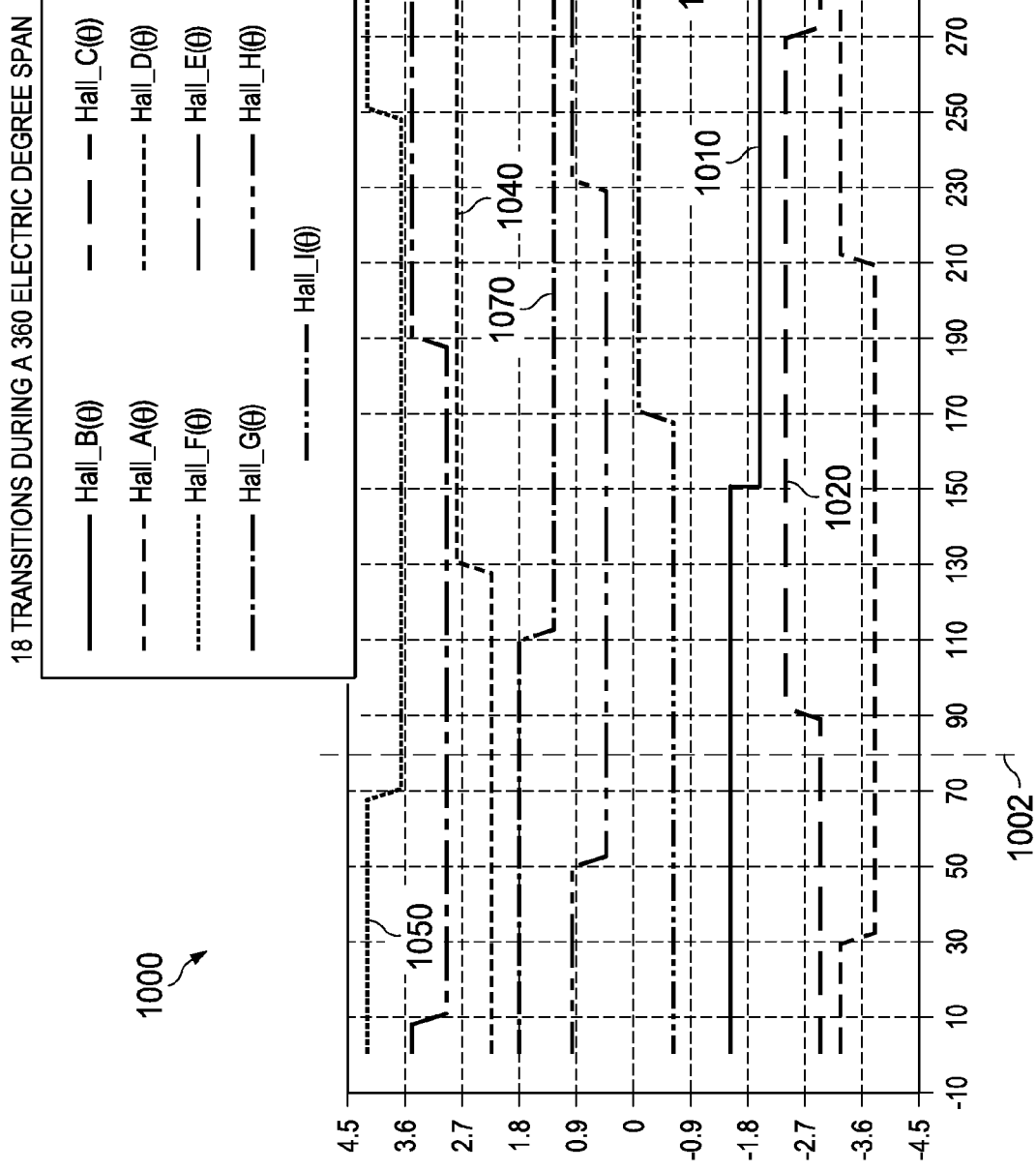

FIGS. 9 and 10 are plots showing example Hall sensor output signals and auxiliary signals of a motor system that has a 20° motor position resolution. The motor system can include a digital Hall sensor A and two linear Hall sensors B and C. The analog signals output from the linear Hall sensors B and C, L_Hall_B (θ) and L_Hall_C (θ), are shown as curves 910 and 920, respectively. The analog signals L_Hall_B (θ) and L_Hall_C (θ), can be raw analog signals output from the linear Hall sensors or can be normalized or otherwise modified signals (e.g., based on the example normalization techniques described with respect to 420 of FIG. 4). In the illustrated example, the three Hall sensors A, B and C are placed such that the phases of the output signals Hall_A (θ) (not shown), L_Hall_B (θ), and L_Hall_C (θ) are offset by 120°. In other instances, the Hall sensors can be placed differently and the example techniques can be adapted accordingly based on the positions of the Hall sensors.

In some implementations, to achieve a resolution of 20° in one 360° electrical cycle, a total of 18 Hall state transitions may be needed. Therefore, besides the six transitions (e.g., zero-crossing points) provided by the three output signals from Hall sensors A, B, and C, 12 extra transitions need to be created. The 12 transitions can be created, for example, by six auxiliary signals with two transitions each within a 360° electrical cycle. One or more of the six auxiliary signals can be digital signals or analog signals.

In the example shown in FIG. 9, the analog Hall sensor signal L_HallB 910 has two transitions (e.g., zero-crossing points) at 150° and 330° while analog Hall sensor signal L_HallC 920 has transitions at 90° and 270°, respectively. The digital signal Hall_A (not shown) has transitions at 30° and 210°. In some instances, two analog auxiliary signals can be determined based on the Hall sensor output signals L_HallB 910 and L_HallC 920. For example, an analog auxiliary signal ECB 930 can be determined such that it is 40° from signal L_HallC 920 while another analog auxiliary signal EBC 940 can be generated such that it is −40° from signal L_HallB 910. The two analog auxiliary signals 930 and 940 can be obtained, for example, by trigonometry shifting:

$$ECB(\theta)=[0.5321(L\_Hall\_C(\theta))-L\_Hall\_B(\theta)] \quad (40)$$
$$EBC(\theta)=[0.5321(L\_Hall\_B(\theta))-L\_Hall\_C(\theta)] \quad (41).$$

The auxiliary signal ECB 930 has two transitions at 130° and 310° and the auxiliary signal EBC 940 has two transitions at 110° and 290°. In some instances, digital auxiliary signals with predetermined transition points can be generated based on the zero-crossing points of the signals L_HallB 910, L_HallC 920, ECB 930 and EBC 940, and amplitude comparisons between these signals.

FIG. 10 shows example auxiliary digital signals 1010-1090 generated based on the Hall sensor output signals L_HallB 910, L_HallC 920, and Hall_A (not shown) and the analog auxiliary signals ECB 930 and EBC 940 in FIG. 9. For illustration purposes, the auxiliary digital signals 1010-1090 in FIG. 10 are shown with different amplitudes so that they can be distinguished from each other in the same plot. In some implementations, each of the auxiliary digital signals may have the same binary values (e.g., 0 and 1) or any other amplitudes. Specifically, curve 1010 in FIG. 10 represents the digital auxiliary signal Hall_B(θ) determined based on zero-crossing points of the analog Hall sensor output signals L_HallB 910, wherein $$\text{Hall\_B}(\theta) = \begin{cases} 1 & \text{if } L\_Hall\_B(\theta) > 0 \\ 0 & \text{Otherwise} \end{cases} \quad (42)$$

Similarly, curve 1020 represents the digital auxiliary signal Hall_C (θ) determined based on analog Hall sensor output signals L_HallC 920, wherein $$\text{Hall\_C}(\theta) = \begin{cases} 1 & \text{if } L\_Hall\_C(\theta) > 0 \\ 0 & \text{Otherwise} \end{cases} \quad (43)$$

Curve 1030 represents the digital auxiliary signal Hall_A (θ) determined based on digital output signal from linear Hall sensor A Hall_A (θ).

Curve (line) 1040 represents the digital auxiliary signal Hall_D determined based on the zero-crossing points of the analog auxiliary signals ECB 930:

$$\text{Hall\_D}(\theta) = \begin{cases} 1 & \text{if } ECB(\theta) > 0 \\ 0 & \text{Otherwise} \end{cases} \quad (44)$$

where the digital auxiliary signal Hall_D transitions from one binary value '1' to another value '0' at 130° and transitions from value '0' to '1' at 310°. In other words, the digital auxiliary signal Hall_D transitions at the zero-crossing points of the analog auxiliary signals ECB 930. Similarly, curve 1070 represents digital auxiliary signal Hall_G determined based on the zero-crossing points of the auxiliary signals EBC 940:

$$\text{Hall\_G}(\theta) = \begin{cases} 1 - & \text{if } EBC(\theta) > 0 \\ 0 & \text{Otherwise} \end{cases} \quad (45)$$

where the digital auxiliary signal Hall_G transitions from one value '1' to another value '0' at 110° and transitions from '0' to '1' at 290°.

In some implementations, amplitude comparison can be used to determining digital auxiliary signals such that the digital auxiliary signals transition from one value to another value at predetermined points. For instance, digital auxiliary signal Hall_E 1060 can be determined by comparing 0.845*ECB with L_HallC 920:

$$\text{Hall\_E}(\theta) = \begin{cases} 1 & \text{if } [0.845(ECB(\theta)) > \text{L\_Hall\_C}(\theta)] \\ 0 & \text{otherwise} \end{cases}, \quad (46)$$

such that the digital auxiliary signal Hall_E 1060 transitions at 10° and 190°. Similarly, digital auxiliary signal Hall_F 1050 can be determined by comparing 0.294*ECB with L_HallC 920:

$$\text{Hall\_F}(\theta) = \begin{cases} 1 & \text{if } [[0.294(ECB(\theta))] > \text{L\_Hall\_C}(\theta)] \\ 0 & \text{otherwise} \end{cases}, \quad (47)$$

such that the digital auxiliary signal Hall_F 1050 transitions at 70° and 250°. Digital auxiliary signal Hall_H 1080 can be determined by comparing 0.845*EBC with L_HallB 910:

$$\text{Hall\_H}(\theta) = \begin{cases} 1 & \text{if } [0.845(EBC(\theta)) > \text{L\_Hall\_B}(\theta)] \\ 0 & \text{otherwise} \end{cases}, \quad (48)$$

such that the digital auxiliary signal Hall_H 1080 transitions at 50° and 230°. Digital auxiliary signal Hall_I 1090 can be determined by comparing 0.293*EBC with L_HallB 910:

$$\text{Hall\_I}(\theta) = \begin{cases} 1 & \text{if } [0.294(EBC(\theta)) > \text{L\_Hall\_B}(\theta)] \\ 0 & \text{otherwise} \end{cases}. \quad (49)$$

The digital auxiliary signal Hall_I 1090 transitions at 170° and 350°. As a result, eighteen transitions of the nine digital auxiliary signals have been created at 10, 30, 50, 70, 90, 110, 130, 150, 170, 190, 210, 230, 250, 270, 290, 310, 330, 350 electrical degrees respectively, achieving the 20 electrical degree resolution.

In some implementations, the analog or digital auxiliary signals can be determined in another manner. For example, additional analog auxiliary signals or analog auxiliary signals different than the EBC and ECB signals can be determined. The digital auxiliary signals can be generated with or without the analog auxiliary signals. The digital auxiliary signals can have expressions different from the equations (42)-(49). The desired transition points can be different than 10, 30, 50, 70, 90, 110, 130, 150, 170, 190, 210, 230, 250, 270, 290, 310, 330, 350 electrical degrees in the example of FIG. 10. Every combination of the binary values of the digital auxiliary signals can represent a distinct position of the motor in the electrical cycle. The binary values of the digital auxiliary signals can be combined or otherwise properly encoded such that the position counter could detect CW and CCW direction and decode and register the position displacements.

Referring back to 440 of the example process 400 in FIG. 4, based on the determined auxiliary signals, a motor position can be determined. For example, as shown in FIG. 10, the nine auxiliary signals have a total of 18 transitions within, and divide, the 0°-360° electrical resolution into 18 intervals: 10°~30°, 30°~50°, 50°~70°, 70°~90°, 90°~110°, 110°~130°, 130°~150°, 150°~170°, 170°~190°, 190°~210°, 210°~230°, 230°~250°, 250°~270°, 270°~290°, 290°~310°, 310°~330°, and 330°~360°. Each interval can correspond to a distinct Hall state represented by an array of nine values of the nine auxiliary signals 1010-1090, respectively. For example, the 10°~30° Hall state can correspond to an array of {100 110 101} while the 30°~50° Hall state can correspond to an array of {100 110 100} as shown in FIG. 10. At a given instance, the values of the nine auxiliary signals 1010-1090 can be determined; and the Hall state transitions and the motor position can be determined based on the values of the nine auxiliary signals 1010-1090. For example, at 1002, given that the values of auxiliary signals 1010-1090 are {000 100 100}, the motor can be determined to be located in the 70°~90° interval. The motor position counter can be configured to count the Hall state transitions and determine the motor position based on the arrays of values of the nine auxiliary signals and their transitions 1010-1090.

In some implementations, the motor position determination algorithm and circuit of a standard BLDC motor with three digital Hall sensors can be used here for a motor that include linear Hall sensors. For instance, in the illustrated example in FIG. 10, the nine digital auxiliary signals can be divided into three groups. Each group can have three digital auxiliary signals that are offset by 120° separation. In this case, each group can have six Hall states (e.g., 100, 110, 010, 011, 001, 101) within a 360° cycle, and the motor position determination algorithm and circuit of a standard BLDC motor with three digital Hall sensors can be used for each group. A combination of the respective Hall states of the three groups can be used to obtain a finer resolution of the motor position (3 times finer in this example). In some other implementations, additional or different techniques can be used to determine the motor position based on the auxiliary signals.

In some implementations, the motor can be commutated based on the three Hall sensor output signals (e.g., Hall_A ($\theta$) 870, L_Hall_B ($\theta$) 810, and L_Hall_C ($\theta$) 820 in FIG. 8, or Hall_A ($\theta$) (not shown), L_Hall_B ($\theta$) 910, and L_Hall_C ($\theta$) 920 of FIG. 9) according to the standard six-step motor drive method, while the Hall sensor outputs and the derived auxiliary signals are used to determine motor rotor position. In other implementations, the increased number of Hall states can be used to commutate the motor, for example, by appropriately adapting the example commutation method described with respect to FIG. 2A. More precise control of motor commutation can be achieved.

At 450 of the example process 400 in FIG. 4, motor torque enhancement techniques can be applied based on the determined motor positions. The example techniques described above can provide a finer position resolution. The finer motor position can facilitate application of different motor torque enhancement techniques, such as sine (or pseudo-sine, enhanced six step) drive, motor current compensation, or other techniques.

Figure 11:
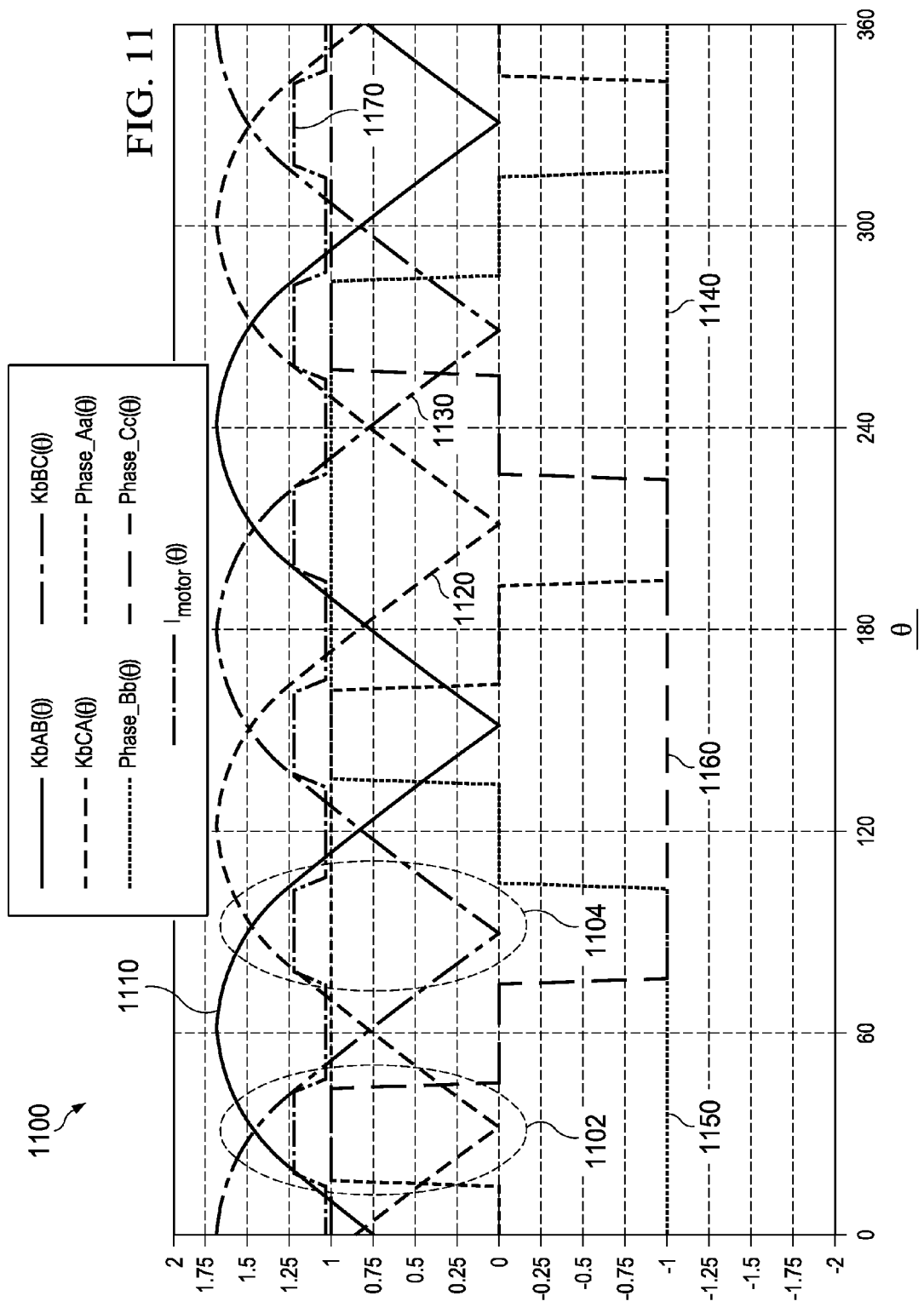
FIG. 11 is a plot showing aspects of example motor torque enhancement techniques.

FIG. 11 is a plot 1100 showing aspects of example motor torque enhancement techniques. Plot 1100 includes line-to-line back EMF voltage curves KbAB 1110, KbCA 1120, and KbBC 1130 and three-phases current Phase_Aa 1140, Phase_Bb 1150, and Phase_Cc 1160. In a standard six-step drive method, a torque ripple can have six "valleys" (e.g., areas 1102 and 1104) at each Hall state transition within a 360° cycle. When the Hall sensor transitions are not perfectly aligned with the motor line-to-line back EMF voltage, the torque valleys may drop below the ideal 13.4% from peak. In some implementations, commutation during transitions can be extended such that two commutation stages can partially overlap. For example, two appropriate phases (or three switches on) can be energized at the same time (near the valleys), thus adding torque from the second energized phase and reducing or minimizing the effects of misaligned Hall transitions. As illustrated in FIG. 11, both Phase_Aa 1140 and Phase_Cc 1160 are energized around the valley region 1102 and both Phase_Bb 1150 and Phase_Cc 1160 are energized around the valley region 1104.

Alternatively or additionally, the torque valley can be improved by increasing the current applied to the motor (e.g., from 8A to 10A or another value) for a short period of time during the torque valley as shown by I_motor 1170 in FIG. 11. Increasing the current can increase torque during the valley and improve the overall torque output performance.

In some instances, with the finer position resolution, the example motor torque enhancement techniques can be applied with a finer granularity. More precise control of the motor system and more efficient energy use can be achieved.

FIG. 12 is a function block diagram of an example motor system 1200. The motor system 1200 includes a brushless motor 1210, a zero-crossing detection module 1220, a FPGA (field programmable gate array) 1230, and a DSP (digital signal processor) 1240. The motor system 1200 can include additional or different components or subsystems. In some implementations, the example components shown in FIG. 12 can be combined, integrated, divided, or configured in another manner.

The example motor 1210 includes a digital Hall sensor A 1212, a linear Hall sensor B 1214 and a linear Hall sensor C 1216. The output signals from linear Hall sensors B 1214 and C 1216 can be fed into the zero-crossing detection module 1220 where the zero-crossing points of each of the analog output signals can be detected. The detected zero-crossing points can be used, for example, to determine auxiliary digital signals based on the analog Hall sensor output signals (e.g., according to example techniques described with respect to FIGS. 8-10 or in another manner). The detected zero-crossing points and the digital output signal from the digital Hall sensor A 1212 can be input into FPGA 1230 for motor commutation and motor position determination. For example, the motor commutation can be a standard six-step drive method based on the output signals from the digital Hall sensor A 1212 and two linear Hall sensors B 1214 and C 1216. In some implementations, the zero-crossing detection module 1220 may determine additional zero-crossing points (including signal transition points) based on a desired motor position resolution. In some implementations, the zero-crossing detection module 1220 can generate or otherwise determine analog or digital auxiliary signals, for example, based on the zero crossing or amplitude comparison techniques described with respect to FIGS. 8-10. The FPGA 1230 can be configured to control the commutation of the motor 1210 and the motor position counter based on an increased number of Hall state transitions and can obtain a finer position resolution.

In some implementations, the digital signal processor (DSP) 1240 with ADC (analog to digital converter) can receive and monitor the analog output signals from the linear Hall sensors B 1214 and C1216, perform normalization of the received analog signals, convert analog Hall sensor signals to digital Hall sensor signals, determine auxiliary signals (e.g., a reference signal and a shifted signal or other auxiliary signals) based on the Hall sensor output signals, determine the motor position, and calibrate the determined motor position, for example, based on the example techniques described with respect to FIGS. 4-11 or other techniques. The DSP 1240 may perform additional or different operations for the motor system 1200.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

A number of examples have been shown and described; various modifications can be made. While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable sub-combination. Accordingly, other implementations are within the scope of the following claims.

The invention claimed is:

1. A motor system comprising:
a motor comprising two linear Hall sensors configured to output analog signals; and
a controller configured to control the motor, the controller being operable to:
monitor the analog signals output from the two linear Hall sensors;
determine, based on the analog signals, a plurality of auxiliary signals having a total number of predetermined zero-crossing points in a 360-electrical-degree span, the total number of predetermined zero-crossing points corresponding to a desired motor position resolution; and
determine a motor position based on the plurality of auxiliary signals.

2. The motor system of claim 1, wherein determining the plurality of auxiliary signals based on the analog signals comprises determining an analog auxiliary signal that has a predetermined zero-crossing point by manipulating the analog signals based on trigonometry rules.

3. The motor system of claim 1, wherein determining the plurality of auxiliary signals based on the analog signals comprises determining a digital auxiliary signal that transitions from a binary value to another binary value at a predetermined transition point over a 360-electrical-degree span.

4. The motor system of claim 1, wherein a number of the plurality of the auxiliary signals is determined based on the desired motor position resolution.

5. The motor system of claim 1, wherein the motor further comprises a digital Hall sensor operate to output a digital signal; and the controller is operable to:
monitor a digital signal output from the digital Hall sensor;
determine three auxiliary signals based on the analog signals output from the two linear Hall sensors; and
determine the motor position based on the analog signals, the digital signal, and the three auxiliary signals.

6. The motor system of claim 1, wherein the controller is operable to improve a motor torque output based on the motor position.

7. A method of operating a motor with two linear Hall sensors, the two linear Hall sensors operable to output analog signals, the method comprising:
monitoring the analog signals output from the two linear Hall sensors;
determining, based on the analog signals, a plurality of auxiliary signals having a total number of predetermined zero-crossing points in a 360-electrical-degree span, the total number of predetermined zero-crossing points corresponding to a desired motor position resolution; and
determining a motor position based on the plurality of auxiliary signals.

8. The method of claim 7, comprising determining a number of the plurality of the auxiliary signals based on the desired motor position resolution.

9. The method of claim 7, wherein determining the plurality of auxiliary signals based on the analog signals comprises:
determining a reference signal based on one of the analog signals; and
converting another of the analog signals to a shifted signal that is 90 electrical degrees from the reference signal; and
wherein determining the motor position based on the plurality of auxiliary signals comprises determining the motor position based on the reference signal and the shifted signal according to an a tan 2 function.

10. The method of claim 8, further comprising:
determining a plurality of reference motor positions;
determining a plurality of motor positions corresponding to a plurality of Hall state transitions of an electrical cycle based on the reference signal and the shifted signal; and
calibrating the plurality of motor positions based on the plurality of reference motor positions.

11. The method of claim 7, further comprising improving a motor torque output based on the motor position.

12. The method of claim 7, wherein determining the plurality of auxiliary signals based on the analog signals comprises determining a digital auxiliary signal that transitions from a binary value to another binary value at a predetermined point over a 360-electrical-degree span.

* * * * *